US006782124B2

(12) United States Patent
Gloersen

(10) Patent No.: US 6,782,124 B2
(45) Date of Patent: Aug. 24, 2004

(54) THREE DIMENSIONAL EMPIRICAL MODE DECOMPOSITION ANALYSIS APPARATUS, METHOD AND ARTICLE MANUFACTURE

(75) Inventor: Per Gloersen, Severna Park, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 778 days.

(21) Appl. No.: 09/729,138

(22) Filed: Nov. 29, 2000

(65) Prior Publication Data

US 2002/0186895 A1 Dec. 12, 2002

Related U.S. Application Data

(63) Continuation of application No. 09/150,671, filed on Sep. 10, 1998, now Pat. No. 6,311,130, which is a continuation-in-part of application No. 08/872,586, filed on Jun. 10, 1997, now Pat. No. 5,983,162.
(60) Provisional application No. 60/023,411, filed on Aug. 14, 1996, and provisional application No. 60/023,822, filed on Aug. 12, 1996.

(51) Int. Cl.$^7$ .............................................. G06K 9/00
(52) U.S. Cl. ...................... 382/154; 382/109; 382/191; 382/194; 382/260; 382/207; 702/2; 702/70

(58) Field of Search ................................ 382/154, 109, 382/173, 191, 192, 194, 232, 276, 260, 263, 264, 207, 107; 345/419; 702/213, 73, 66, 67, 70; 73/784, 170.16, 170.26

(56) References Cited

U.S. PATENT DOCUMENTS 6,654,485 B1 * 11/2003 Mitra et al. .................. 382/131

* cited by examiner

Primary Examiner—Timothy M. Johnson
Assistant Examiner—Ali Bayat
(74) Attorney, Agent, or Firm—Keith L. Dixon

(57) ABSTRACT

An apparatus and method of analysis for three-dimensional (3D) physical phenomena. The physical phenomena may include any varying 3D phenomena such as time varying polar ice flows. A repesentation of the 3D phenomena is passed through a Hilbert transform to convert the data into complex form. A spatial variable is separated from the complex representation by producing a time based covariance matrix. The temporal parts of the principal components are produced by applying Singular Value Decomposition (SVD). Based on the rapidity with which the eigenvalues decay, the first 3–10 complex principal components (CPC) are selected for Empirical Mode Decomposition into intrinsic modes. The intrinsic modes produced are filtered in order to reconstruct the spatial part of the CPC. Finally, a filtered time series may be reconstructed from the first 3–10 filtered complex principal components.

46 Claims, 21 Drawing Sheets

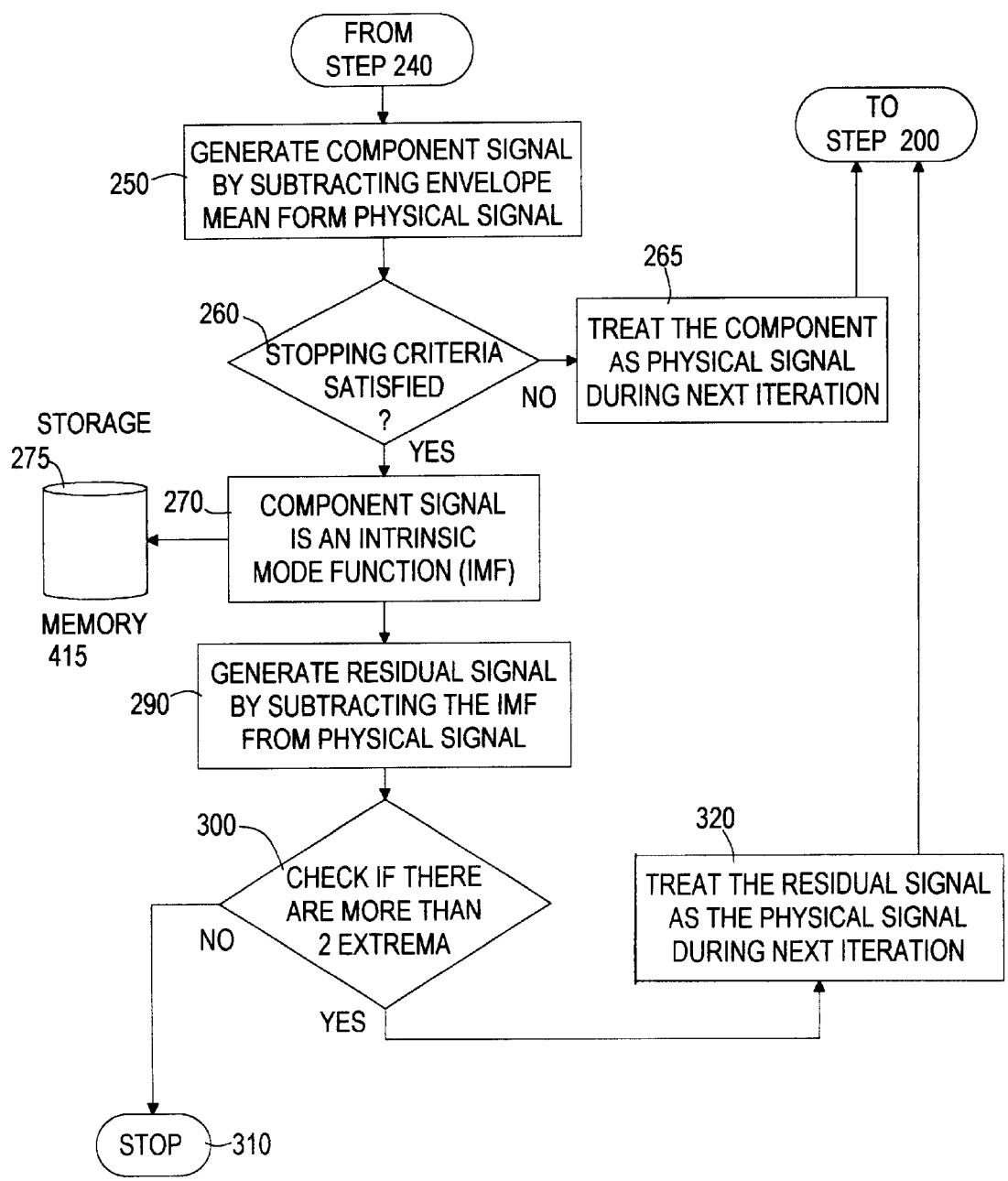

EMD-IMF without intermittency option

THREE DIMENSIONAL EMPIRICAL MODE DECOMPOSITION ANALYSIS APPARATUS, METHOD AND ARTICLE MANUFACTURE

CROSS REFERENCES TO RELATED APPLICATIONS

This application is a con of application Ser. No. 09/150,671 filed Sep. 10, 1998, now U.S. Pat. No. 6,311,130 which is a continuation-in-part of application Ser. No. 08/872,586 filed Jun. 10, 1997, now issued as U.S. Pat. No. 5,983,162, which itself claims priority under 35 U.S.C. §119(e) to U.S. Provisional application Ser. No. 60/023,411 filed on Aug. 14, 1996 and Ser. No. 60/023,822 filed on Aug. 12, 1996.

ORIGIN OF INVENTION

The inventor of the invention described herein is an employee of the United States Government. Therefore, the invention may be manufactured and used by or for the Government for governmental purposes without the payment of any royalties thereon or therefor.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field of the Invention

This invention generally relates to a data analysis method, apparatus and article of manufacture and more particularly to apparatus, article of manufacture and analysis method for analyzing three dimensional data varying with respect to a forth independent dimension such as three dimensional time varying data.

Although the present invention finds utility in processing time varying three dimensional data, it is to be understood that any varying n dimensional data (where $n \geq 3$) representative of a real world phenomenon such as data representative of a physical process including electrical, mechanical, biological, chemical, optical, geophysical or other process(es) may be analyzed and thereby more fully understood by applying the invention thereto. The real world n-dimensional data to which the invention finds utility include a wide variety of real world phenomena such as the behavior of a stock market, population growth, traffic flow, etc. Furthermore, the term "real world n-dimensional data" also includes "physical data" representative of physical processes such as the electrical, mechanical, biological, chemical, optical, geophysical process(es) mentioned above.

Although the invention is not limited to a particular type of signal processing and includes the full range of real world data representative of processes or phenomena or combinations thereof, it is most useful when such real world n-dimensional data are nonlinear and non-stationary.

2. Description of Related Art

In the parent application, several examples of data from geophysical data signals representative of earthquakes, ocean waves, tsunamis, ocean surface elevation and wind were processed to show the invention's wide utility to a broad variety of signal and data types. The techniques disclosed therein and elaborated upon herein represent major advances in physical data processing.

Previously, analyzing data, particularly those having nonlinear and/or nonstationary properties, was a difficult problem confronting many industries. These industries have harnessed various computer implemented methods to process data measured or otherwise taken from various processes such as electrical, mechanical, optical, biological, and chemical processes. Unfortunately, previous methods have not yielded results which are physically meaningful.

Among the difficulties found in conventional systems is that representing physical processes with physical signals may present one or more of the following problems:

(a) The total data span is too short;
(b) The data are nonstationary; and
(c) The data represent nonlinear processes.

Although problems (a)–(c) are separate issues, the first two problems are related because a data section shorter than the longest time scale of a stationary process can appear to be nonstationary. Because many physical events are transient, the data representative of those events are nonstationary. For example, a transient event such as an earthquake will produce nonstationary data when measured. Nevertheless, the nonstationary character of such data is ignored or the effects assumed to be negligible. This assumption may lead to inaccurate results and incorrect interpretation of the underlying physics as explained below.

A variety of techniques have been applied to nonlinear, nonstationary physical signals. For example, many computer implemented methods apply Fourier spectral analysis to examine the energy-frequency distribution of such signals.

Although the Fourier transform that is applied by these computer implemented methods is valid under extremely general conditions, there are some crucial restrictions: the system must be linear, and the data must be strictly periodic or stationary. If these conditions are not met, then the resulting spectrum will not make sense physically.

A common technique for meeting the linearity condition is to approximate the physical phenomena with at least one linear system. Although linear approximation is an adequate solution for some applications, many physical phenomena are highly nonlinear and do not admit a reasonably accurate linear approximation.

Furthermore, imperfect probes/sensors and numerical schemes may contaminate data representative of the phenomenon. For example, the interactions of imperfect probes with a perfect linear system can make the final data nonlinear.

Many recorded physical signals are of finite duration, nonstationary, and nonlinear because they are derived from physical processes that are nonlinear either intrinsically or through interactions with imperfect probes or numerical schemes. Under these conditions, computer implemented methods which apply Fourier spectral analysis are of limited use. For lack of alternatives, however, such methods still apply Fourier spectral analysis to process such data.

In summary, the indiscriminate use of Fourier spectral analysis in these methods and the adoption of the stationarity and linearity assumptions may give inaccurate results some of which are described below.

First, the Fourier spectrum defines uniform harmonic components globally. Therefore, the Fourier spectrum needs many additional harmonic components to simulate nonstationary data that are nonuniform globally. As a result, energy is spread over a wide frequency range.

For example, using a delta function to represent the flash of light from a lightning bolt will give a phase-locked wide white Fourier spectrum. Here, many Fourier components are added to simulate the nonstationary nature of the data in the time domain, but their existence diverts energy to a much wider frequency domain. Constrained by the conservation of energy principle, these spurious harmonics and the wide frequency spectrum cannot faithfully represent the true energy density of the lighting in the frequency and time space.

More seriously, the Fourier representation also requires the existence of negative light intensity so that the components can cancel out one another to give the final delta function representing the lightning. Thus, the Fourier components might make mathematical sense, but they often do not make physical sense when applied.

Although no physical process can be represented exactly by a delta function, some physical data such as the near field strong earthquake energy signals are of extremely short duration. Such earthquake energy signals almost approach a delta function, and they always give artificially wide Fourier spectra.

Second, Fourier spectral analysis uses a linear superposition of trigonometric functions to represent the data. Therefore, additional harmonic components are required to simulate deformed wave profiles. Such deformations, as will be shown later, are the direct consequence of nonlinear effects. Whenever the form of the data deviates from a pure sine or cosine function, the Fourier spectrum will contain harmonics.

Furthermore, both nonstationarity and nonlinearity can induce spurious harmonic components that cause unwanted energy spreading and artificial frequency smearing in the Fourier spectrum. The consequence is incorrect interpretation of physical phenomena due to the misleading energy-frequency distribution for nonlinear and nonstationary data representing the physical phenomenon.

According to the above background, the state of the art does not provide a useful computer implemented tool for analyzing nonlinear, nonstationary physical signals. Geophysical signals provide a good example of a class of signals in which this invention is applicable. Great grandparent application Ser. No. 08/872,586 filed on Jun. 10, 1997, now issued as U.S. Pat. No. 5,983,162 illustrates several types of nonlinear, nonstationary geophysical signals which are very difficult to analyze with traditional computer implemented techniques including earthquake signals, water wave signals, tsunami signals, ocean altitude and ocean circulation signals.

This application extends the technique of the parent, grandparent and great-grandparent applications to the processing of three-dimensional data and signals representative thereof. Three-dimensional data representing, for example, time varying physical phenomena are an increasing subject of various processing techniques. In fact, the above-described prior art techniques such as Fourier analysis are routinely applied to process such three-dimensional data.

Three-dimensional physical phenomena often are nonlinear and/or nonstationary. Therefore, like the one-dimensional and two-dimensional data processing techniques described above, the conventional processing techniques are simply inadequate to process such three-dimensional data.

Moreover, conventional data analysis methods are utilized to separate the various scales contained in the three-dimensional data. For example, in antarctic ice flow and antarctic ice protuberance evaluation processing, conventional spectral analysis was applied toward an objective analysis of the information contents. However, where the data contained spatial and temporal components, the presence or absence of spatial propagation was not determinable and led to erroneous results.

SUMMARY OF THE INVENTION

It is a purpose of the present invention is to solve the above-mentioned problems in conventional signal analysis techniques;

It is another purpose of the present invention to analyze three-dimensional phenomena varying with respect to a fourth independent dimension;

It is yet another purpose of the present invention to perform spectral analysis on non-stationary three-dimensional geophysical phenomenon data, such as a time sequence of gridded geophysical data maps of a particular geographical location.

The present invention permits valid intercomparison of various data sequences on an intrinsic mode-by-mode basis to enhance greatly the ability to establish teleconnections between various geophysical variables. The present invention is an apparatus, article of manufacture and method of analysis wherein a physical phenomenon is analyzed by: (1) removing a linear trend line to keep subsequent matrix operations within machine capabilities; (2) passing the data through an Hilbert transform to convert the data into complex form; (3) removing a spatial variable by producing a covariance matrix in time; (4) producing the temporal parts of the principal components by applying Singular Value Decomposition (SVD); (5) based on the rapidity with which the eigenvalues decay, select the first 3–10 principal components (PCs) for Empirical Mode Decomposition (EMD) into intrinsic modes; (6) selecting the intrinsic modes produced in order to produce either a high-pass, low-pass, or bandpass filter; (7) reconstructing a spatial part of the PCs (multiplied by the appropriate eigenvalues) by multiplying the unfiltered temporal part into the original data; and, as a final check, (8) reconstructing a filtered time series from the first 3–10 filtered complex PCs.

Computer implemented Empirical Mode Decomposition method decomposes principal components representative of a physical phenomenon into Intrinsic Mode Functions (IMFs) that are indicative of intrinsic oscillatory modes in the physical phenomenon.

Contrary to almost all the previous methods, this new computer implemented method is intuitive, direct, a posteriori, and adaptive, with the basis of the decomposition based on and derived from the physical signal. The bases so derived have no close analytic expressions, and they can only be numerically approximated in a specially programmed computer by utilizing the inventive methods disclosed herein.

More specifically, using the general method of the present invention the physical signal is analyzed without suffering the problems associated with computer implemented Fourier analysis. Namely, the present invention avoids inaccurate interpretation of the underlying physics caused in part by energy spreading and frequency smearing in the Fourier spectrum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. Furthermore, all the mathematic expressions are used as a short hand to express the inventive ideas clearly and are not limitative of the claimed invention.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 3(b) is a continuation of the high-level flowchart in FIG. 3(a) describing the Sifting Process which may be implemented on the computer system shown in FIG. 1;

DETAILED DESCRIPTION OF PREFERRED EMBODIMENTS

Computer for Implementing the Inventive Method

Figure 1:
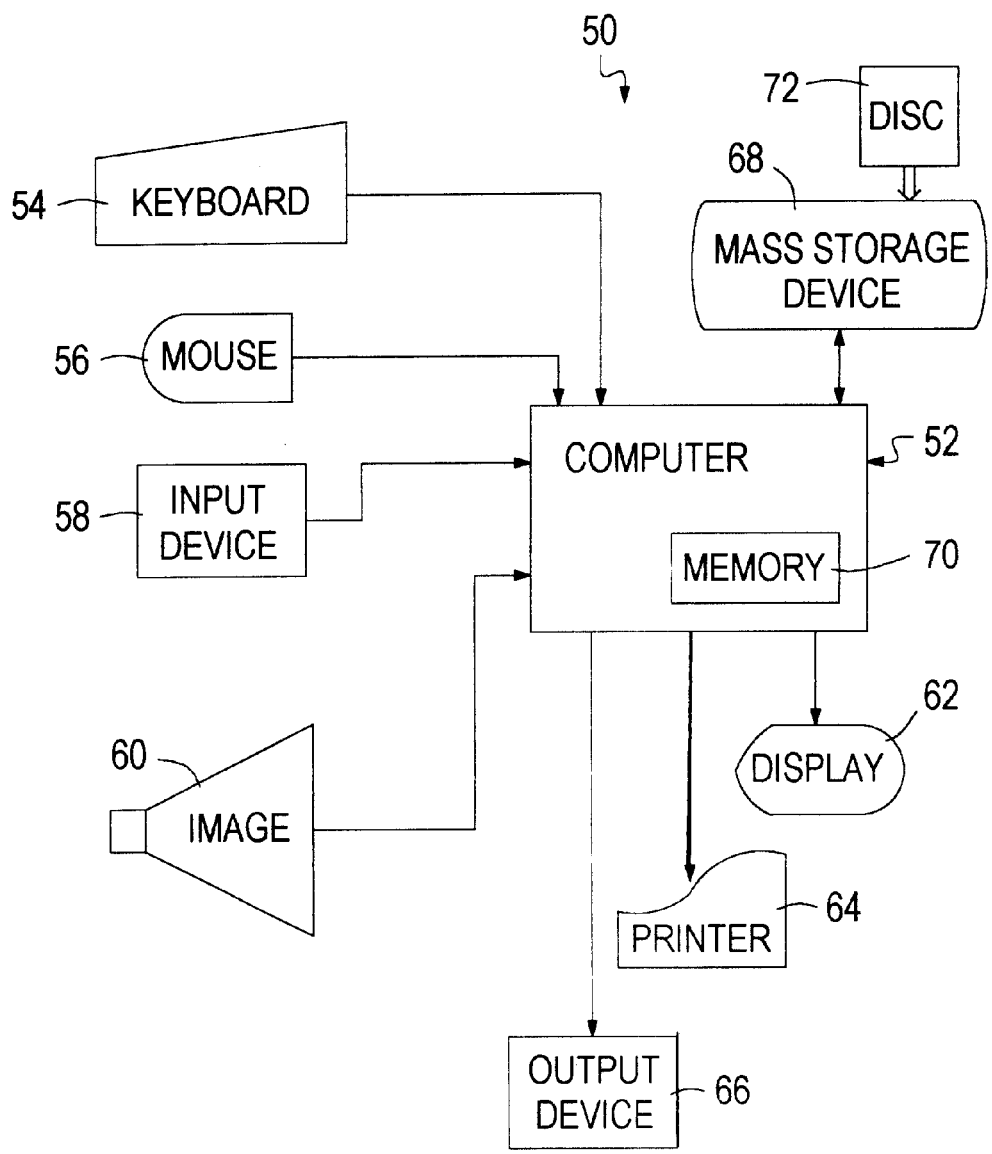
FIG. 1 is a high-level block diagram of a computer system which may be programmed with the inventive with the result being a special purpose computer.

Turning now to the drawings, a computer system 50 and computer 52 suitable for programming with the inventive method is diagrammatically shown in the block diagram of FIG. 1. To allow human interaction with the computer 52, the computer system includes a keyboard 54 and mouse 56. The computer, programmed with the inventive method, is analogous to an electrical filter or a mechanical sieve: it separates digital data into series of IMF's according to their time scales in a manner analogous to electrically filtering harmonics or a mechanical sieve which separates aggregated sand particles according to their physical size.

Because the invention is applied to analyze physical signals, the computer system 100 also includes an input device 58, and/or an imaging device 60 which are used to collect image information on a physical phenomenon and generate physical data representative thereof. Input device 58 may include an antenna connected to a radio receiver for receiving radio transmitted data, for example, from a remote imaging station such as the National Aeronautics and Space Administration (NASA) Nimbus 7 satellite.

To output the results of the computer implemented method, the computer system 50 also includes a display 62 such as a cathode ray tube or flat panel display, a printer 64 and an output device 66. Each of these outputs (62, 64, 66) should have the capability to generate or otherwise handle color outputs because, for example, the Hilbert Spectrum may be in color.

The generalized output device 66 may also include a network connection to connect the computer 50 to a local or wide area network. In this way, the physical signal may be inputted from the network. Thus, all outputs can be sent to another location via such a network connection.

Furthermore, the computer system 50 also includes a mass storage device 68. The mass storage device 68 may be a hard disk, floppy disc, optical disc, etc. The mass storage device 68 may be used to store a computer program which performs the invention when loaded into the computer 52. As an alternative, the input device 58 may be a network connection or off-line storage which supplies the computer program to the computer 52.

More particularly, the computer program embodiment of the invention may be loaded from the mass storage device 68 into the internal memory 70 of the computer 52. The result is that the general purpose computer 52 is transformed into a special purpose machine that implements the invention.

Even more particularly, each step of inventive method will transform at least a portion of the general purpose computer 52 into a special purpose computer module implementing that step. For example, when a sifting step is implemented on the computer 52, the result is a computer implemented sifting apparatus (sifter) that performs the sifting functions of sifting step.

Other embodiments of the invention include firmware embodiments and hardware embodiments wherein the inventive method is programmed into firmware (such as EPROM, PROM or PLA) or wholly constructed with hardware components. Constructing such firmware and hardware embodiments of the invention would be a routine matter to one of ordinary skill using known techniques.

Article of Manufacture

Still further, the invention disclosed herein may take the form of an article of manufacture. More specifically, the article of manufacture is a computer-usable medium, including a computer-readable program code embodied therein wherein the computer-readable code causes computer 52 to execute the inventive method.

A CD-ROM, a DVD-ROM, high density moveable storage or a computer diskette such as disc 72 in FIG. 1 are examples of such a computer-usable medium. When the disc 72 is loaded into the mass storage device 72, the computer-readable program code stored therein is transferred into the computer 52. In this way, the computer 52 may be instructed to perform the inventive methods disclosed herein.

Method for Carrying Out the Invention

Before describing the computer implemented Three-Dimensional (3-D) Empirical Mode Decomposition (3D-EMD) analysis method in detail, the definition and physical meaning of intrinsic mode functions in general is discussed.

Intrinsic Mode Function

An Intrinsic Mode Function (IMF) is a function that satisfies the following two conditions:

(a) in the whole data set, the number of extrema and the number of zero-crossings must either be equal or differ at most by one, and (b) at any point, the mean value of upper envelope defined by the maxima and the lower envelope defined by the minima is zero.

The first condition shares some similarity to the traditional narrow band requirements for a stationary Gaussian process. The second condition is a totally new idea. Conceptually, the second condition modifies the classical global requirement to a local one. Furthermore, the second condition has the desirable result that the instantaneous frequency will not have unwanted fluctuations induced by asymmetric wave forms. Mathematically, the second condition should ideally be "the local mean of the data being zero." For nonstationary data, the "local mean" requires a "local time scale" to compute the mean, which is impossible to define. Fortunately, the local time scale need not be defined to fulfil the second condition, as is discussed below.

To apply these concepts to physical data, the local mean of the signal envelopes are used to force the local symmetry. The signal envelopes are defined by the local maxima and the local minima. This is an approximation which avoids the definition of a local averaging time scale. With the physical approach and the approximation adopted here, the inventive method does not always guarantee a perfect instantaneous frequency under all conditions. Nevertheless, it can be shown that, even under the worst conditions, the instantaneous frequency so defined is still consistent with the physics of the system being studied and represents the system being studied much more accurately than previous techniques based on Fourier analysis.

The term "Intrinsic Mode Function" is adopted because it represents the oscillation mode embedded in the data. With this definition, the IMF in each cycle, defined by the zero-crossings, involves only one mode of oscillation. In other words, each IMF represents only one group of oscillation modes or time scales and no riding waves are allowed in an IMF.

Before presenting the inventive 3D-EMD analysis method for decomposing a physical phenomena represented as three-dimensional data into IMFs, a qualitative assessment of the intrinsic oscillatory modes may be roughly determined by simply examining the data by eye. From this examination, one can immediately identify the different scales directly in two ways: the time lapse between the successive alternations of local maxima and minima and the time lapse between the successive zero-crossings reveals the different scales. The interlaced local extrema and zero-crossings give us complicated data: one undulation is riding on top of another, and they, in turn, are riding on still other undulations, and so on. Each of these undulations defines a characteristic scale or oscillation mode that is intrinsic to the data: hence, the term "Intrinsic Mode Function" is adopted.

To reduce the data into the needed IMFs, the invention utilizes a computer implemented Empirical Mode Decomposition Method which is described hereinbelow.

Overview of Three-Dimensional Signal Processing

The term "three-dimensional data" is used herein to denote the measurement of a physical quantity across three-dimensions. For example, three-dimensional data include images generated by a multichannel microwave imagers on board the NASA Nimbus 7 and the DOD DMSP F8, F11 and F13 satellites.

Figure 2:
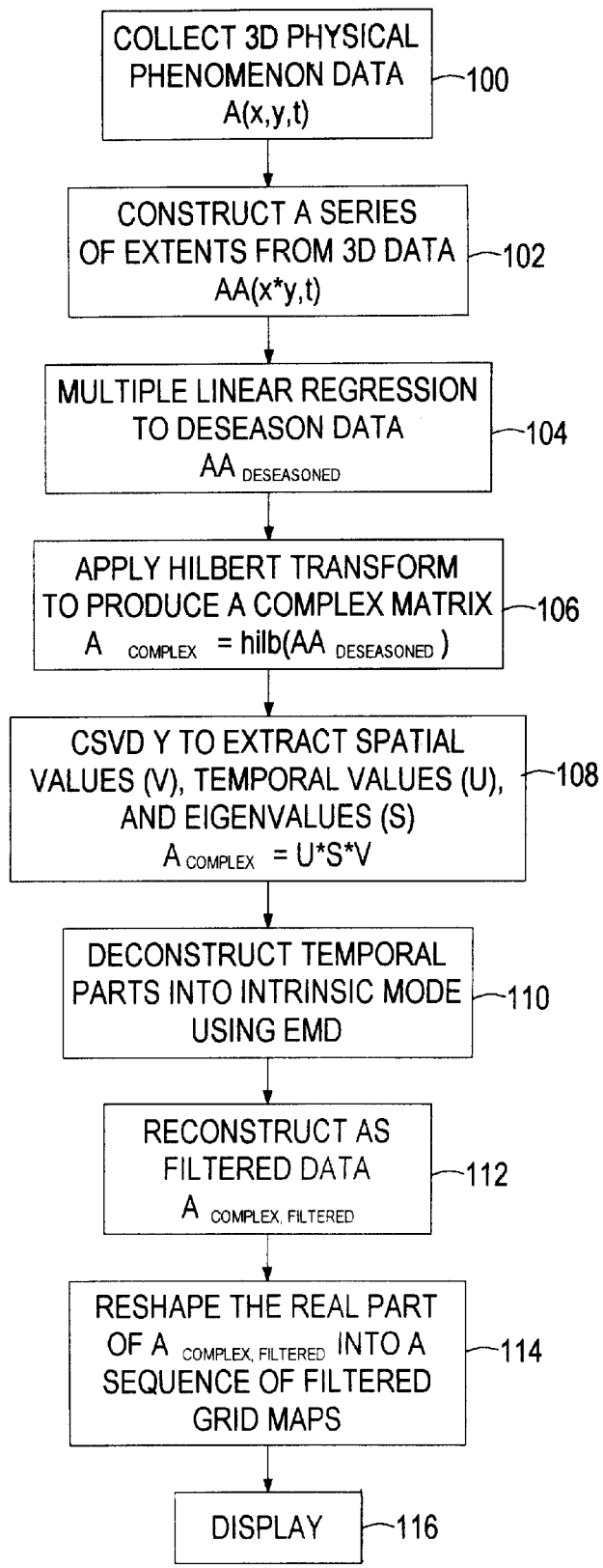
FIG. 2 is a high-level flowchart describing the overall inventive method which may be implemented on the computer system shown in FIG. 1.

FIG. 2 illustrates the overall inventive method of processing three-dimensional data including generation of intrinsic mode functions (the Sifting Process). To begin the preferred processing method, the data are collected for the three-dimensional physical activity, process or phenomena, sensed by an appropriate sensor or imager in step 100. For example an image of a physical phenomena may be sensed by a multichannel microwave imager 58 to generate a three-dimensional representation.

In this example, the three-dimensional data represent propagation of sea ice protuberances around Antarctica. The data are analyzed using the analysis technique of the present invention, which is appropriate for non-stationary time series, in particular using empirical decomposition to extract intrinsic mode functions from the data. Previously, spectral analysis was applied to the interior of the Antarctic sea ice pack using band-limited discreet Fourier transform of a shorter 1978–1987 sea ice time series. This prior approach provided phase distributions of two components observed in the El Niño Southern Oscillation (ENSO) signal, with periods of ca. 2.4 and 4.2 years, suggestive of a propagating wave in the interior of the pack.

By contrast, the analysis method of the present invention examines sea ice extents, in this example, using Empirical Mode Decomposition (EMD) in combination with Complex Singular Value Decomposition (CSVD). First, CSVD is used to separate the data into spatial and temporal components and, then, EMD is used to divide the temporal signal into distinct modes, representing narrow frequency pass-bands. It is understood that as used herein complex is intended to have its ordinary engineering/scientific meaning, i.e., having a real and an imaginary or phase component, e.g., impedance may include resistance and reactance. Reconstruction of each intrinsic mode from its first 3 CPC's then permits construction of contour and 3-D plots that reveal the presence or absence of spatial propagation of respective nodes.

So, in step 100 of FIG. 2, the 3D data are collected in a sequence of grid maps, A(x,y;t). In step 102 the 3D data are reshaped into a 2-D array AA(x*y;t). In the method of preferred embodiment, the 3D representation is segmented into sectors identical at each time sample and extents are calculated for each particular sector. The extents are determined essentially by summing all of the area within the sector above a threshold level (e.g., 15%) for the particular characteristic being analyzed, e.g., ice concentrations. Typically, the area within each sector is segmented into smaller identically sized areas of a given granularity and the number of smaller areas above the threshold are counted. So, for example, representing each of the smaller areas as a pixel on a display, an area of polar ice may be represented as one degree longitudinal sectors of sea ice extents (the sum of areas of pixels with ice concentrations at or above 15%).

Next, in step 104, the reshaped 3D data may be deseasoned by subtracting a model seasonal cycle and a trend line, which are both obtained using multiple linear regression to model the data. Thus, the deseasoned ($AA_{Deseasoned}$) result may be represented:

$$AA_{Deseasoned} = AA - a_0 + a_1 t + \sum_{k=1}^{5} [a_{2k} \cos(2\pi kt/\tau) + a_{(2k+1)} \sin(2\pi kt/\tau)],$$

where $a_n$ are coefficients of the model obtained as a result of the multiple linear regression and $\tau$ is the annual period in units of time (t). Deseasoning the data may help to contain the subsequent matrix operations within the operating capabilities of the particular machine.

Continuing in step 106, the deseasoned data are passed through an Hilbert transform to preserve spatial phase information, $A_{complex}$=hilb ($AA_{Deseasoned}$). Then, in step 108, the complex Principal Components (PC) are obtained using Singular Value Decomposition (SVD), separating the spatial component of the Hilbert transform, U, from the temporal component, V. Thus, $A_{complex}$=U*S*V',
where,
U=U(position, PC#);
S=S(PC#,PC#) (eigenvalues, or weights) and
V=V(time, PC#).

In step 110, the temporal parts of the first 10 CPCs, for example, are decomposed into their respective intrinsic modes by means of Empirical Mode Decomposition. The prime on V in the above equation for $A_{complex}$ indicates the matrix transpose of V. In step 112, the data are reconstructed as filtered by selecting a single mode or collection of modes (the first ten, for example) constituting a band-pass filter (a low pass filter in this example):

$A_{complex, filtered}$=U(position, 1:10)*S(1:10, 1:10)*$V_{filtered}$(time, 1:10)'.

Finally, in step 114, the real part of $A_{complex, filtered}$ is reshaped into a sequence of filtered grid maps and the filtered grid map results are displayed in 116.

The preferred method of the present invention has been applied successfully to an Antarctic circumpolar wave in the perimeter of the ice pack, represented as a time series of the sea ice extents (essentially the area within the ice perimeter) in 1-degree longitudinal sectors for the period 1978–1996, as observed with the multichannel microwave imagers on board the NASA Nimbus 7 and the DOD DMSP F8, F11, and F13 satellites. After converting the time series into complex numbers by means of a Hilbert transform, the time series of the 360 sectors was decomposed into its complex principal components (CPCs), effectively separating the spatial and temporal values. Then, the real and imaginary parts of the temporal portions of the first 3 CPCs were decomposed into their intrinsic modes using Empirial Mode Decomposition. Each decomposition represents a narrow frequency band, resulting in a collection of 3 CPCs for each intrinsic mode. Finally, the data were filtered and reconstructed in two different ways. First, using a low-pass (lp) filter on the data, all of the intrinsic modes of each CPC with periods longer than 2 years were combined and the result designated as lp-filtered. Next, the intrinsic mode of each CPC with periods of approximately 4 years was selected and designated the quasiquadrennial (QQ) modes. The lp-filtered time series showed eastward-propagating azimuthal motion in the Ross and Weddell Seas, but no clearly circumpolar motion. The QQ time series, on the other hand, clearly showed eastward-propagating circumpolar waves, but with occasional retrograde motion to the west.

Thus the steps described above were implemented in MatLab language as follows:

```
100  Let the gridded data series by represented by D(x,y,t)
102  DD(x * y,t)=detrend(D(x*y,t))  /*The spatial coordinates have been
                                     arranged in a one-dimensional vector*/
104  hDD=hilbert(DD)
106  hDDD=transpose (hDD)*hDD
108  [V,SS,V]=svd(hDDD)             /*Procedure to produce the temporal parts of
                                     the PCs, V, and the eigenvalues, S. Because
                                     hDDD is symmetric, V appears twice on the
                                     left-hand side */
110  VV(time,PC#,mode)=emd(V(time,PC#))
                                    /*EMD step 110 applied to the temporal part
                                     of the first 3–10 PCs.*/
112  VVf=transpose(VV(time,PC#,selected modes))
                                    /* e.g., selected modes are a single mode or,
                                     all modes with period > one year */
114  U(position,selected PCs)*S(selected PCs,selected PCs)=hDD*V(time,selected PCs)
                                    /* Produces an unfiltered U*/
116  DD=  real(U(position,selected PCs)*S(selected PCs,selected PCs)*
           VV(time, selected PCs, selected PCs)
                                    /*Reconstructs a filtered time series */
```

The Hilbert Spectrum

Prior to the sifting process of step 110, the Hilbert Transform is applied in step 106 to each component to preserve spatial phase information $A_{complex}$.

Thus, a brief tutorial on the Hilbert transform with emphasis on its physical interpretation can be found in Bendat and Piersol, 1986, "*Random Data: Analysis and Measurement Procedures*", 2nd Ed., John Wiley & Sons, New York, N.Y. Essentially, the Hilbert transform is the convolution of X(t) with 1/t. This convolution emphasizes the local properties of X(t). In more formal terms, given a time series X(t), the Hilbert Transform Y(t) can be expressed as $$Y(t) = \frac{1}{\pi} P \int_{-\infty}^{\infty} \frac{x(t')}{t - t'} dt',$$

where P indicates the Cauchy principal value.

With this definition, X(t) and Y(t) form a complex conjugate pair. This complex conjugate pair Z(t) may be expressed as:

$$Z(t)=X(t)+iY(t)=a(t)e^{i\Theta(t)},$$

in which $$a(t)=[X^2(t)+Y^2(t)]^{1/2},$$

$$\Theta(t) = \arctan\frac{X(t)}{Y(t)}.$$

So, in step 106, the Hilbert transform is applied to the deseasoned data ($AA_{Deseasoned}$) to provide $A_{complex}$=Z(t), which preserves spatial phase information and contains the temporal and spatial information for each of the CPCs. SVD is applied to $A_{complex}$ in step 108 to extract the CPCs. EMD is applied in step 110 individually to each of these extracted CPCs.

Empirical Mode Decomposition (EMD): The Sifting Process

Figure 3A:
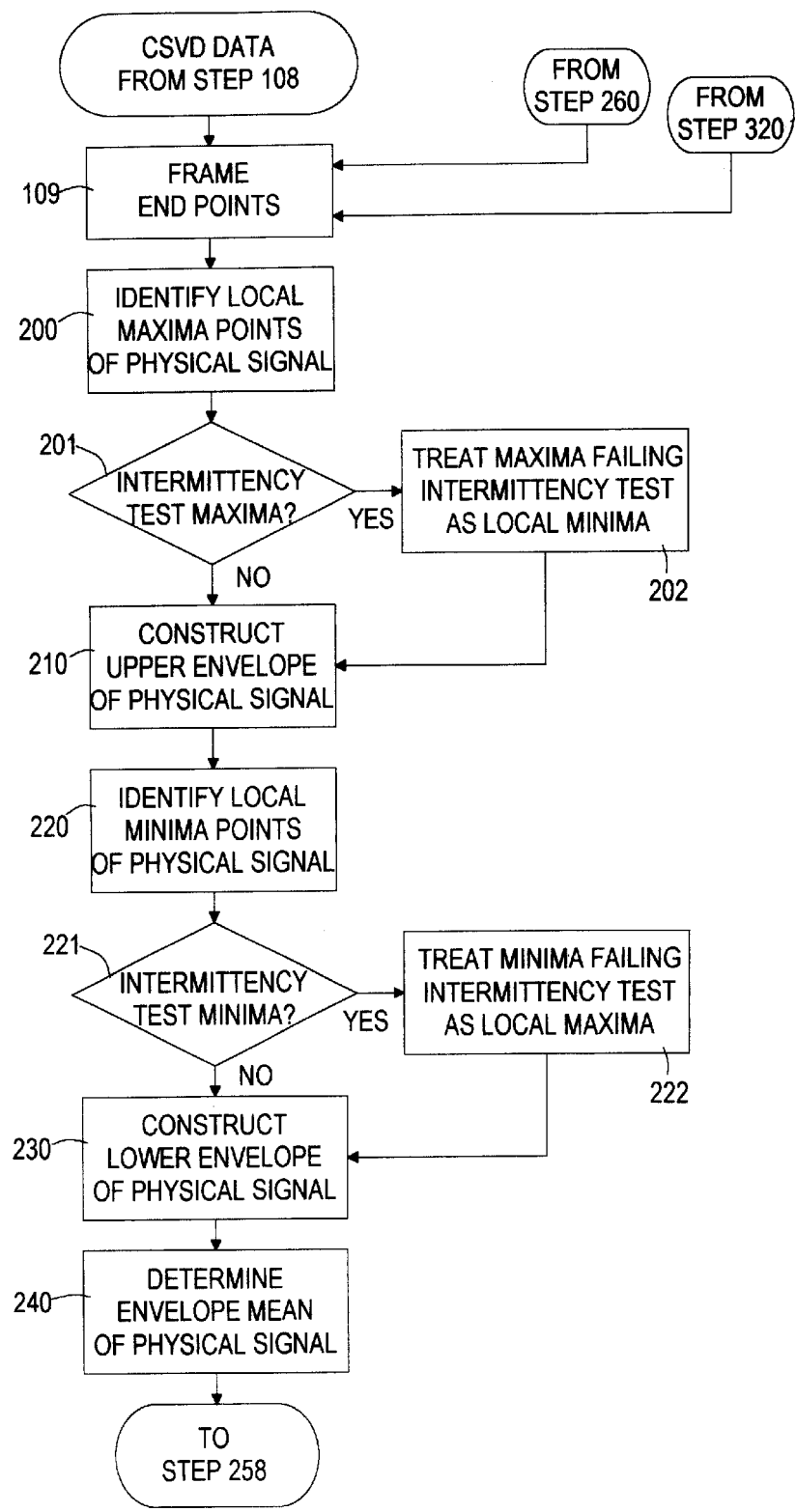
FIG. 3(a) is a high-level flowchart describing the Sifting Process which may be implemented on the computer system shown in FIG. 1.

FIGS. 3A–B show the steps in the Empirical Mode Decomposition of step 110 wherein CPCs are decomposed into their respective intrinsic modes. The essence of the EMD step 110 is to identify, empirically, the intrinsic oscillatory modes by their characteristic time scales in the data, and then decompose the data accordingly. The decomposition is based on the following general assumptions:

a. the signal has at least two extrema: one maximum and one minimum, and
b. the characteristic timescale is defined by the time lapse between the extrema.

In other words, the time lapse between successive extrema are employed as the definition of the time scale for the intrinsic oscillatory mode because it gives a much finer resolution of the oscillatory modes and because it can be applied to data with non-zero mean (either all positive or all negative values, without zero-crossings). A systematic way to extract the intrinsic mode functions is the computer implemented Empirical Mode Decomposition method or Sifting Process which is described as below.

Optional intermittency tests (201,221) may be introduced to alleviate the aliasing effects associated with intermittence in the data that can cause mode mixing. These optional intermittency tests (201, 221) are conducted before construction of the envelope in steps 210 and 230. Optional intermittency test 201 checks the distance between successive maxima for whether the distance is within a pre-assigned value n times the shortest distance between waves. If not, then an intermittency exists and the next step is step 202. Otherwise, there is no intermittency and the upper envelope is constructed in step 210 as further described below.

Similarly optional intermittency test 221 checks the distance between successive minima for whether the distance is within a pre-assigned value n times the shortest distance between waves. If not, then an intermittency exists and the next step is step 222. Otherwise, there is no intermittency and the upper envelope is constructed in step 230 as further described below.

An example of such intermittency is shown in FIG. 4(*a*), in which small scale waves appear only intermittently. By strict application of the Sifting Process, the resulting IMF's are given in FIGS. 4(*b*), in which two drastically different time scales are present in the first IMF component as shown in FIG. 4(*c*). This mixing of modes breaks up the main wave train by the small intermittent oscillations.

If intermittency tests (201, 222) are employed that utilize a preassigned value of n-times the shortest distance between waves, the resulting IMFs are shown in FIGS. 4(*d*)–(*f*), in which the modes are clearly and physically separated. Effectively, mode mixing is eliminated by treating the local extrema that failed the intermittency test (201, 221) as local maxima and minima (in steps 202 and 212), respectively. Therefore, the upper and lower envelope will be identical as the original data reference line.

As noted above, these intermittency tests 201, 221 and subsequent steps 202, 222 are optional. By selecting an artificially large value for n in steps 201 and 221 to test for intermittency, the test will be effectively bypassed. Otherwise, these tests 201, 221 can be bypassed at the initial selection of the program.

Next, an upper envelope 20 is constructed for the physical signal 10 in step 210. The upper envelope 20 is shown in FIG. 4(*b*) using a dot-dashed line. This upper envelope 20 is preferably constructed with a cubic spline that is fitted to the local maxima.

In step 220, the local minimum values of the physical signal 10 are identified. To complete the envelope, a lower envelope 30 is constructed from the local minimum values in step 230. The lower envelope 30 is also shown in FIG. 4(*b*) using a dot-dash line. Like the upper envelope 20, the lower envelope 30 is preferably constructed with a cubic spline that is fitted to the local minima.

The upper and lower envelopes 20, 30 should encompass all the data within the physical signal 10. From the upper and lower envelopes 20, 30, an envelope mean 40 is the determined in step 240. The envelope mean 40 is the mean value of the upper and lower envelopes 20, 30. As can be seen in FIG. 4(*b*), the envelope mean 40 bisects the physical signal 10 quite well.

Then, the first component signal $h_1$ is generated in step 250 by subtracting the envelope mean 40 from the physical signal 10. This computer implemented step 250 may also be expressed as:

$$X(t)-m_1=h_1,$$

where the envelope mean 40 is $m_1$ and the physical signal is X(t).

FIG. 4(*g*) shows the first component signal $h_1$. Ideally, the first component signal $h_1$ should be an IMF, for the construction of $h_1$ described above seems to have made $h_1$ satisfy all the requirements of an IMF. In reality, however, a gentle hump that resides on a slope region of the data can become an extremum when the reference coordinate is changed from the original rectangular coordinate to a curvilinear coordinate. For example, the imperfection of the envelopes 20, 30 can be seen by observing the overshoots and undershoots at the 4.6 and 4.7 second points in FIG. 4(*b*).

An example of this amplification can be found in the gentle hump between the 4.5 and 4.6 second range in the data in FIG. 4(*h*). After the first round of sifting, the gentle hump becomes a local maximum at the same time location in the first component signal $h_1$ shown in FIG. 4(*h*). New extrema generated in this way actually recover the proper modes lost in the initial examination. Thus, the Sifting Process extracts important information from the signal which may be overlooked by traditional techniques. In fact, the Sifting Process can recover low amplitude riding waves, which may appear as gentle humps in the original signal, with repeated siftings.

Still another complication is that the envelope mean 40 may be different from the true local mean for nonlinear data.

Consequently, some asymmetric wave forms can still exist no matter how many times the data are sifted. This must be accepted because, after all, the inventive method is an approximation as discussed before.

Other than these theoretical difficulties, on the practical side, serious problems of the spline fitting can occur near the ends, where the cubic spline being fit can have large swings. Left by themselves, the end swings can eventually propagate inward and corrupt the whole data span especially in the low frequency components. A numerical method has been devised to eliminate the end effects details of which will be given later. Even with these problems, the Sifting Process can still extract the essential scales from the data.

The Sifting Process serves two purposes: to eliminate riding waves and to make the wave profiles more symmetric. Toward these ends, the Sifting Process has to be repeated. Because only the first component signal $h_1$ has been generated so far, the decision step 260, which tests successive component signals to see if they satisfy the definition of an IMF, is bypassed during the first iteration.

Thus, step 265 is performed which treats the component signal as the physical signal in the next iteration. The next iteration is then performed by executing steps 200–250. In step 250, the second component signal $h_{11}$ is generated by subtracting the envelope mean from the physical signal (in this iteration, the first component signal $h_1$ is treated as the physical signal). In more formal terms:

$$h_1 - m_{11} = h_{11}$$

Figure 4A:
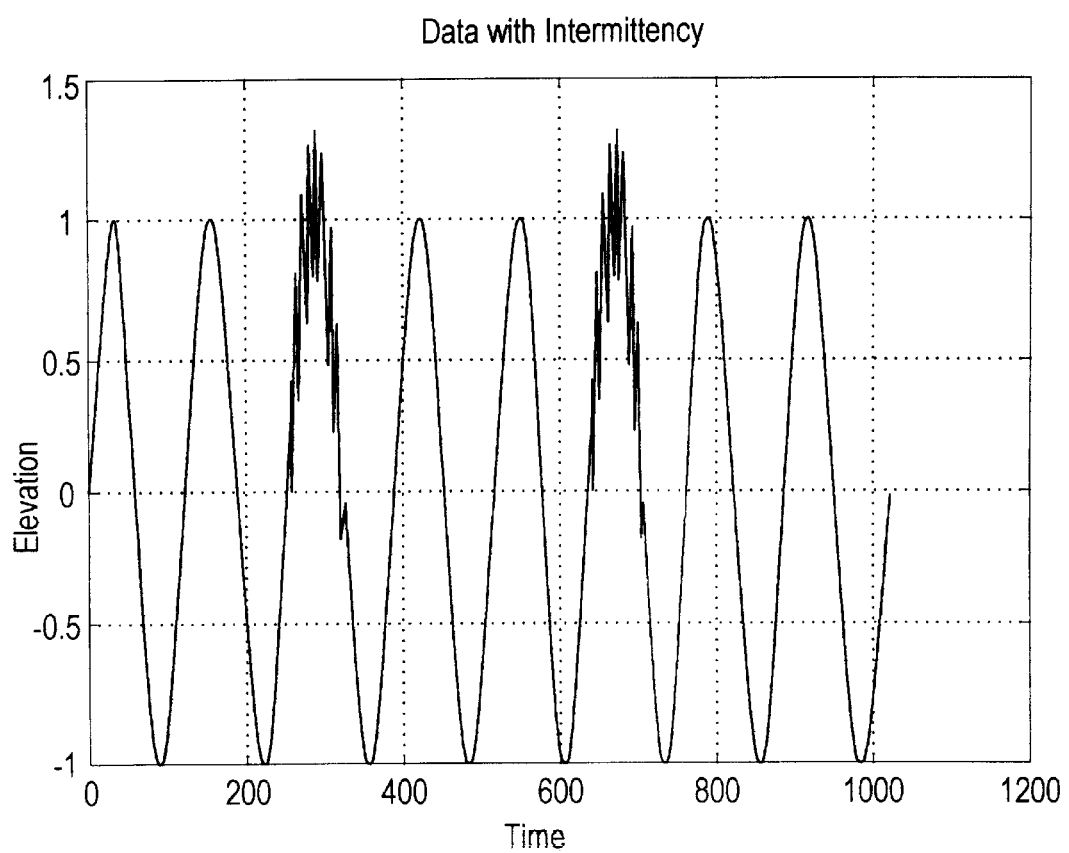
FIG. 4(a) is a graph of data with intermittency for illustrating an optional intermittency test of the invention.
Figure 4B:
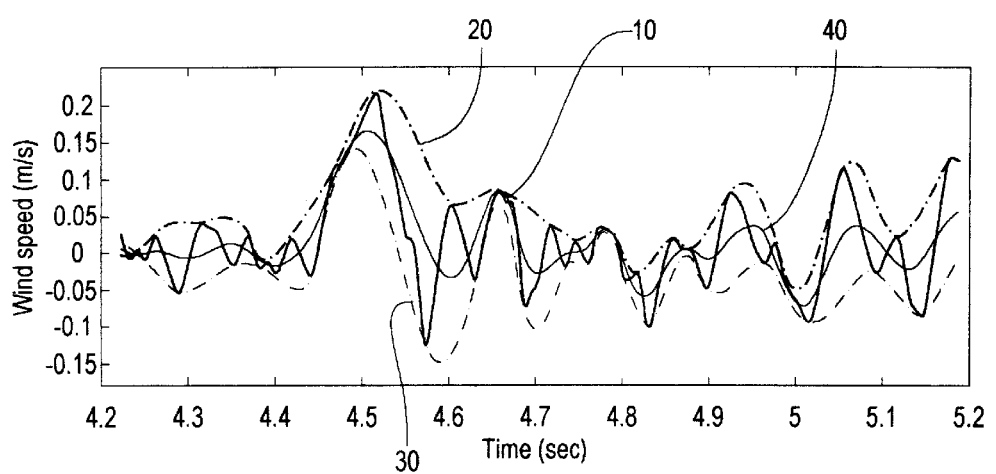
FIG. 4(b) is a graph illustrating the upper envelope, lower envelope, envelope mean and original data which are utilized to explain the computer implemented Empirical Mode Decomposition method of the invention.
Figure 4C:
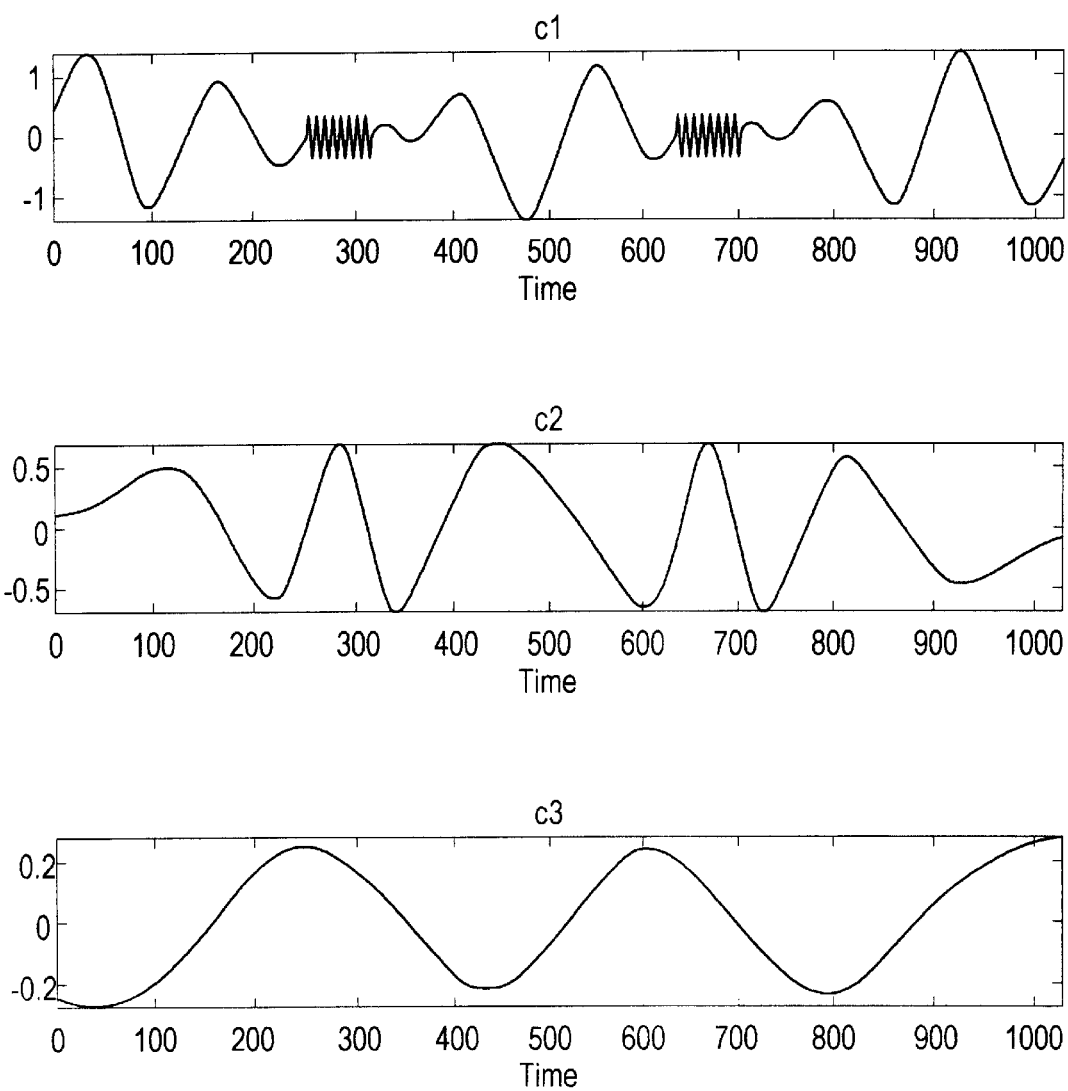
FIGS. 4(c) is a graph of the first intrinsic mode function when the Sifting Process is applied to the data of FIG. 4(a) without applying the intermittency test option.
Figure 4D:
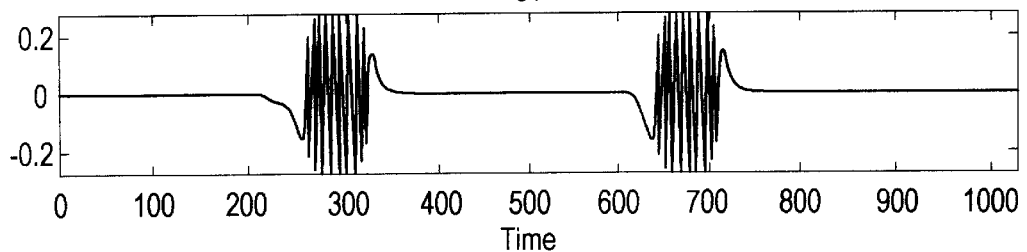
FIGS. 4(d)–(f) are graphs of the first, second, and third intrinsic mode functions when the Sifting Process is applied to the data of FIG. 4(a) which applies the intermittency test option.
Figure 4E:
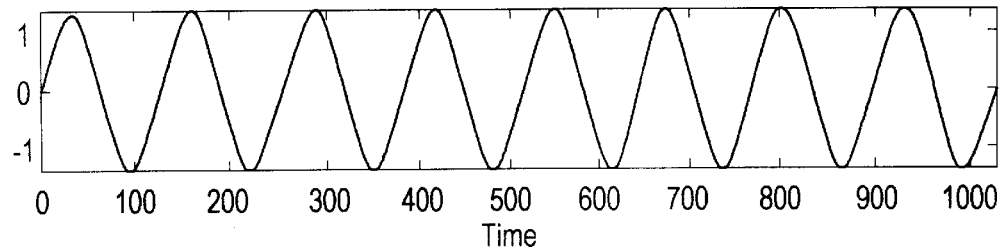
Figure 4F:
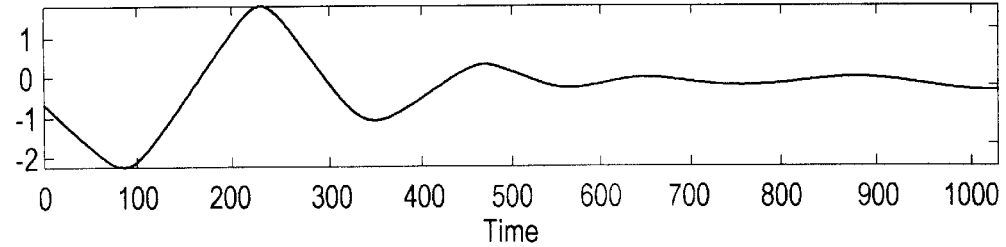
Figure 4G:
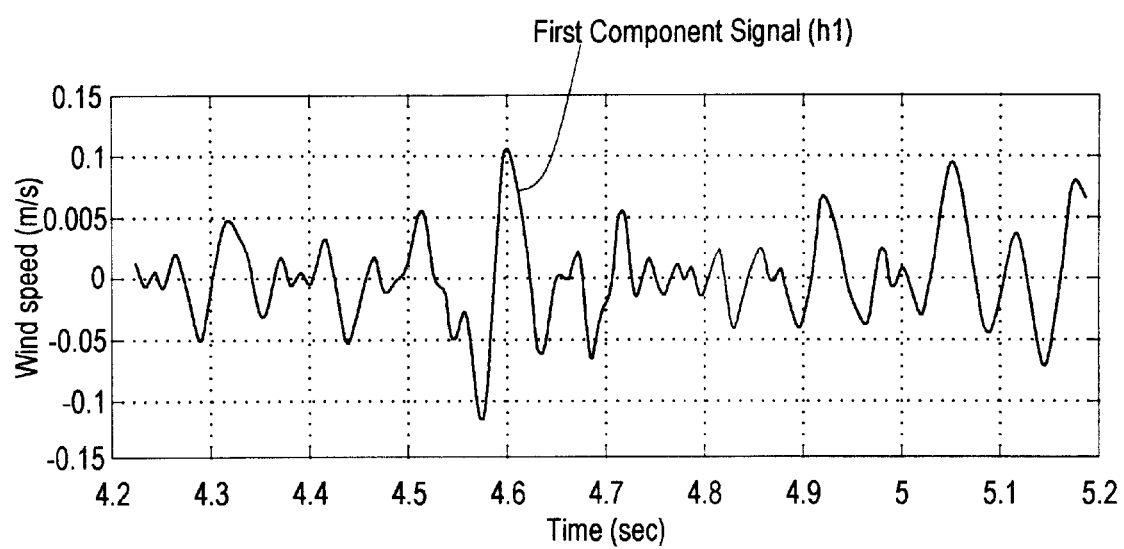
FIGS. 4(g) shows a graph of the first component signal $h_1$ generated by the Sifting Process of the invention.
Figure 4H:
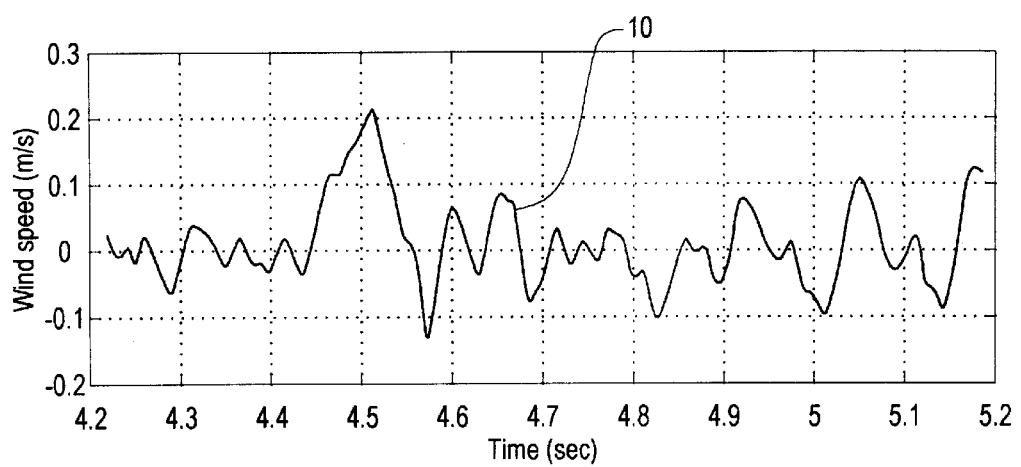
FIG. 4(h) shows wind speed data in the form of a graph plotting wind speed as a function of time for explaining the computer implemented Empirical Mode Decomposition method of the invention.
Figure 4I:
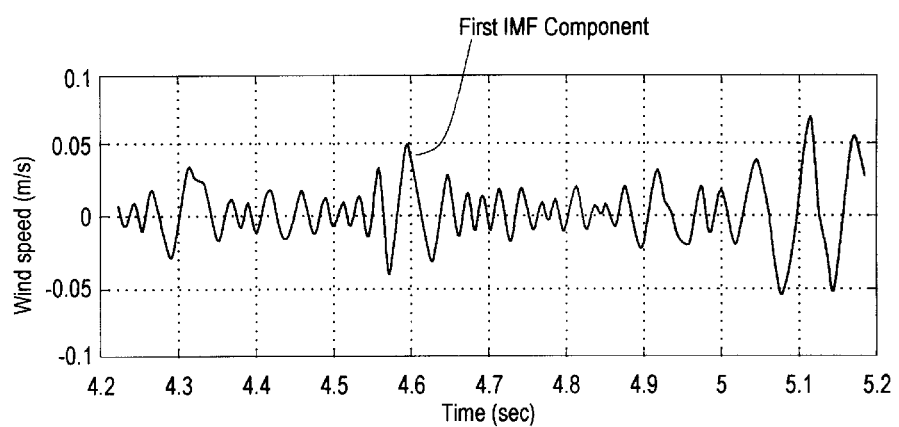
FIG. 4(i) is a graph of the first intrinsic mode function component which is generated by the Sifting Process of the invention.

FIG. 4(h) shows the second component signal $h_{11}$. Although the second sifting shows great improvement in the signal with respect to the first sifting, there is still a local maximum below the zero line. After a third sifting, the result (third component signal $h_{12}$) is shown in FIG. 4(h). Now all the local maxima are positive, and all the local minima are negative, but to ensure this configuration is stable, the Sifting Process should be further repeated. In general, the Sifting Process is repeated at least 3 more times and, in general, K times to produce $h_{1k}$. If no more new extrema are generated, then $h_{1k}$ is an IMF. In formal terms:

$$h_{1(k-1)} - m_{1k} = h_{1k}.$$

The resulting first IMF component is shown in FIG. 4(f) after 9 siftings. The first IMF component of the physical signal may be designated as such in step 270 and stored in step 275 in memory 70, $c_1 = h_{1k}$.

As mentioned above, all these manipulations are carried out numerically in a computer 52. There is not explicit close form analytic expression for any of the computer implemented steps.

As described above, the process is indeed like sifting of the data by the computer 52 because it separates the finest (shortest time scale) local mode from the data first based only on the characteristic time scale. The Sifting Process, however, has two effects:

a. to eliminate riding waves, and
b. to ensure the envelopes generated by maxima and minima are symmetric.

While the first condition is necessary for the instantaneous frequency to be meaningful (as discussed below), the second condition is also necessary in case the neighboring wave amplitudes have too large a disparity. Unfortunately, the effects of the second condition, when carried to the extreme, could obliterate the physically meaningful amplitude fluctuations. Therefore, the Sifting Process should be applied with care, for carrying the process to an extreme could make the resulting IMF a pure frequency modulated signal of constant amplitude.

To guarantee that the IMF component retains enough physical sense of both amplitude and frequency modulations, a stopping criterion is employed to stop the generation of the next IMF component. This stopping criterion is part of the computer implemented method and is shown as step 260 in FIG. 3(b). Step 260 is a decision step that decides whether the stopping criteria has been satisfied. The preferred stopping criteria determines whether three successive component signals satisfy the definition of IMF. If three successive component signals all satisfy the definition of IMF, then the Sifting Process has arrived at an IMF and should be stopped by proceeding to step 270. If not, step 260 starts another iteration by proceeding to step 265 as described above.

Alternatively, another stopping criteria could be used that determines whether successive component signals are substantially equal. If successive component signals are substantially equal, then the Sifting Process has arrived at an IMF and should be stopped by proceeding to step 270. If not, step 260 starts another iteration by proceeding to step 265 as described above.

Determining whether successive component signals are substantially equal in the alternative stopping criteria limits the size of the standard deviation, sd, computed from the two consecutive sifting results as follows:

$$sd = \sum_{t=0}^{T} \left[ \frac{|h_{1(k-1)}(t) - h_{1k}(t)|^2}{h_{1(k-1)}^2(t)} \right].$$

A very rigorous and preferred value for sd is set between 0.2 and 0.3. Of course, if faster processing is desired, then a trade-off such as a less rigorous value for sd may be used.

Overall, the first IMF component $c_1$ should contain the finest scale or the shortest period component of the physical signal 10.

Before extracting the next IMF component, a test should be conducted to determine if the Sifting Process should stop. The stopping criteria is shown in Step 300. Step 300 determines whether the component signal has more than 2 extrema. If not, all of the IMF's have been extracted and the Sifting Process is stopped by proceeding to step 310. If so, then additional IMF's may be extracted by continuing the process in step 320.

Step 270 recognizes that an IMF component has been successfully generated by the Sifting Process by setting the component signal equal to an intrinsic mode function. More specifically, step 270 causes the computer 52 to store the component signal $h_{1k}$ as an intrinsic mode function in memory 70.

Then, the first IMF is Separated from the physical signal in step 290 to generate a residual signal. In particular, a residual signal is generated by subtracting the intrinsic mode function from the physical signal. In formal terms:

$$X(t) - c_1 = r_1.$$

Because the residue, $r_1$, still includes information of longer period components, it is treated as the new physical data and subjected to the same Sifting Process as described above. Step 320 performs this function by treating the residual signal as the physical signal in the next iteration. Thereafter, the next iteration is performed beginning with the execution of step 200 as described above.

The Sifting Process is repeated for all the Subsequent $r_j$'s. This iterative procedure may be expressed as:

$$r_1-c_2=r_2,$$

$$r_{n-1}-c_n=r_n.$$

In step 300 the Sifting Process ends by proceeding to stop step 310 if the residual signal $r_n$ has more than 2 extrema. Otherwise, the method proceeds to step 320.

In other words, Step 310 stops the Sifting Process if the residual signal $r_n$ is monotonically increasing or decreasing. This stopping criterion is based on the fact that an IMF cannot be extracted from a monotonic function. Even for data with zero mean, the final residue still can be different from zero. For data with a trend, the final residue should be that trend. If $r_n$ is not monotonically increasing/decreasing, then a next iteration is performed beginning with step 320.

In summary, the Sifting Process decomposes the physical signal X(t) into a series of intrinsic mode functions and a residue which may be expressed as:

$$x(t) = \sum_{i=1}^{n} c_i + r_n.$$

In other words, the invention extracts a series of IMFs by Sifting the physical signal with a computer implemented Empirical Mode Decomposition method. This IMF series cannot be generated or derived by any analytic method. It can only be extracted by the invention through a specially programmed computer through the Sifting Process (local extrema or curvature extrema type).

Display of Selected Results

The various results of the above-described computer implemented method are displayed in step 116. These displays are extremely useful in analyzing the underlying physics of the physical phenomenon being studied as described above. Furthermore, particular examples of these displays and the increased understanding of the underlying physics which these displays permit are discussed in the following section.

For example, the inventions generates various Hilbert spectra displays in the display step 116. As mentioned above, both color coded maps and contour maps may be employed to display the Hilbert spectra in display step 116. In addition, the color coded maps convey information to the operator in a uniquely accessible way permitting a more thorough and deeper understanding of the physical phenomenon and may be considered as necessary to analyze some physical phenomena.

The displays generated by the invention in display step 116 are central to the invention because they allow an operator to analyze the underlying physics of the physical phenomenon being studied.

The display step 116 outputs displays to display 62. As mentioned above, display 62 includes devices such as a cathode ray tube and a flat panel display. As an alternative, display step 116 may generate a hard copy output by utilizing printer 64 or may send the generated display to output device 66.

Application of the Preferred Embodiment

Figure 5:
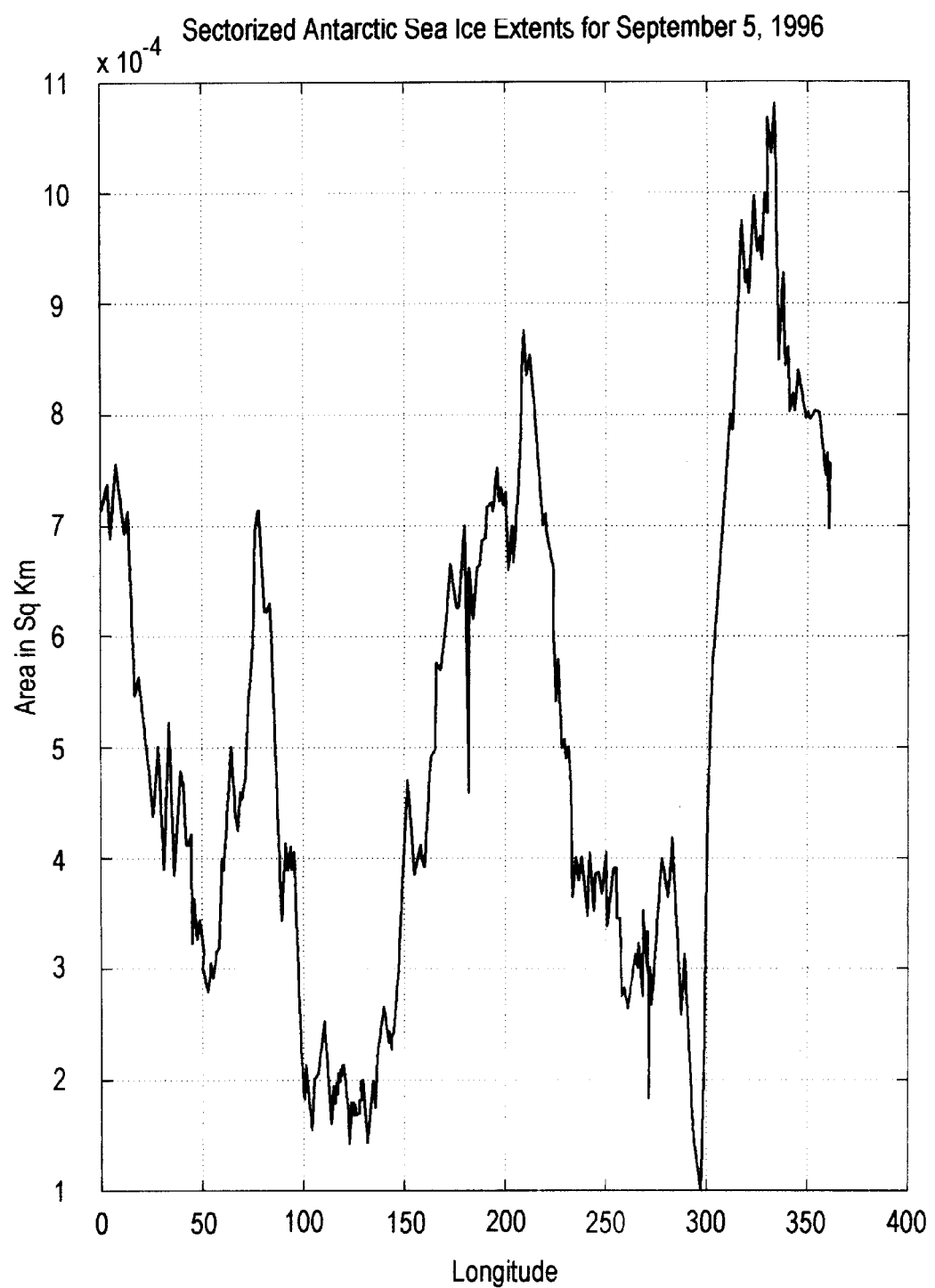
FIG. 5 shows Antarctic sea ice extents in 1° meridional sectors on Sep. 1, 1996.

Here, for ease in discerning an Antarctic circumpolar wave in the perimeter of the ice pack, a time series of the sea ice extents (the sum of the areas of pixels with ice concentrations of 15% or more) is constructed in 1-degree longitudinal sectors for the period 1978–1996, as observed with multichannel microwave imagers on board the NASA Nimbus 7 and the DOD DMSP F8, F11 and F13 satellites the data are transmitted to input device 58. An example of the data is shown in FIG. 5 for a typical day in Austral Winter.

Next, Complex Singular-Value Decomposition (CSVD) is used to decompose the time series of the 360 sectors into its principal components, after subtracting its linear trend line, effectively separating the spatial and temporal values. The results of the CSVD procedure can be expressed as:

$$Y(3322, 360)=U(3322,360)* S(360,360) * V(360,360)'$$

after the original data have been subjected to a Hilbert transform to produce a complex data vector matrix, Y referred to as $A_{complex}$ hereinabove. Y is represented by the product of two complex unitary matrices, U, which contains the temporal information for each of the 360 CPCs (PC#) and V, which contains the spatial information for each of the CPCs. S is a diagonal matrix of real eigenvalues. The prime on V denotes the matrix transpose. The time number 3322 corresponds to the number of data days in the 18.2-year time series (including a 21-day data day gap in the DMSP F8 imager record, which has been filled by interpolation with a modeled seasonal cycle).

Figure 6A:
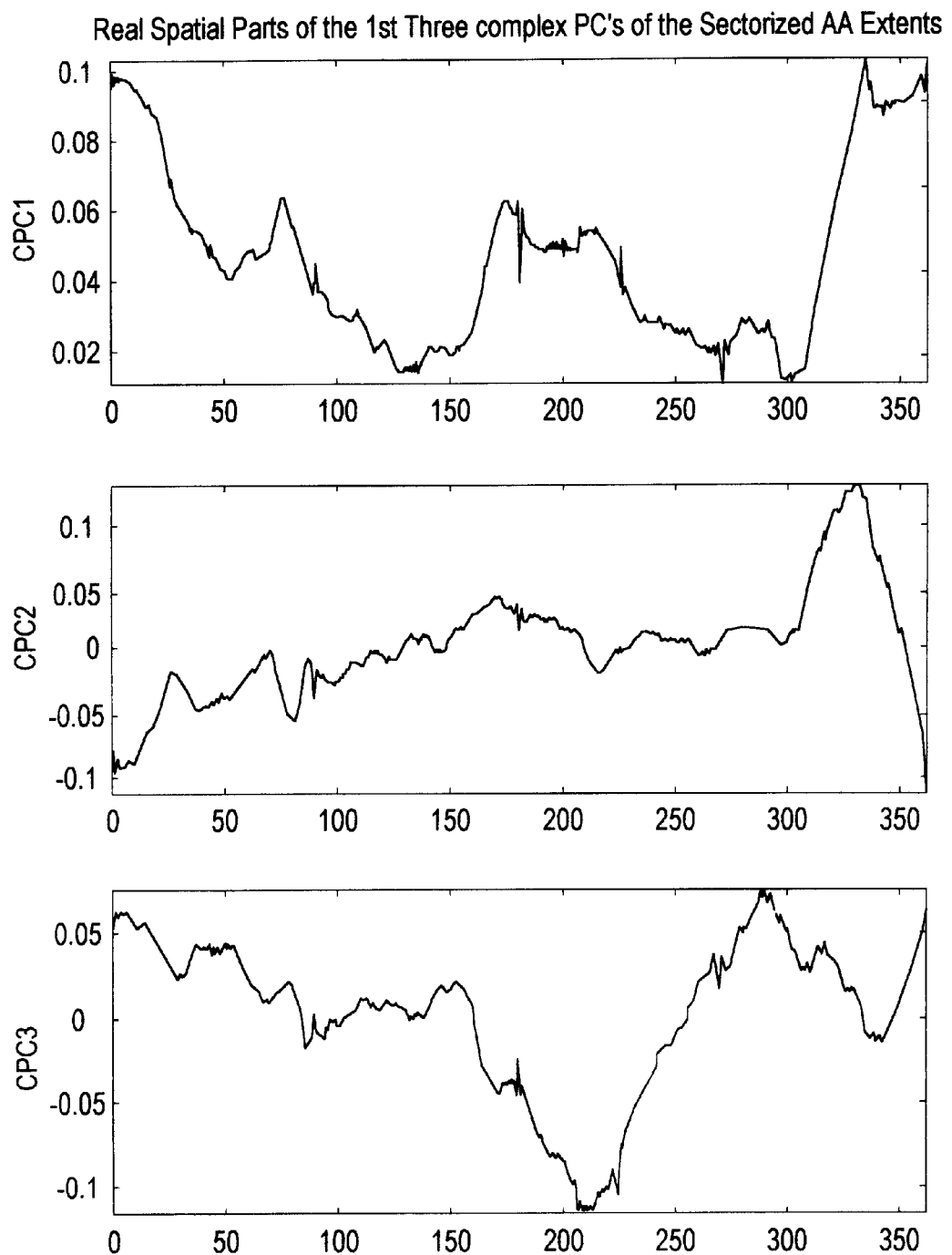
FIGS. 6(a)–(b) show real spatial and temporal parts of the first 3 Complex Principal Components of the time series of the Antarctic sea ice extents in 1° meridional sectors.
Figure 6B:
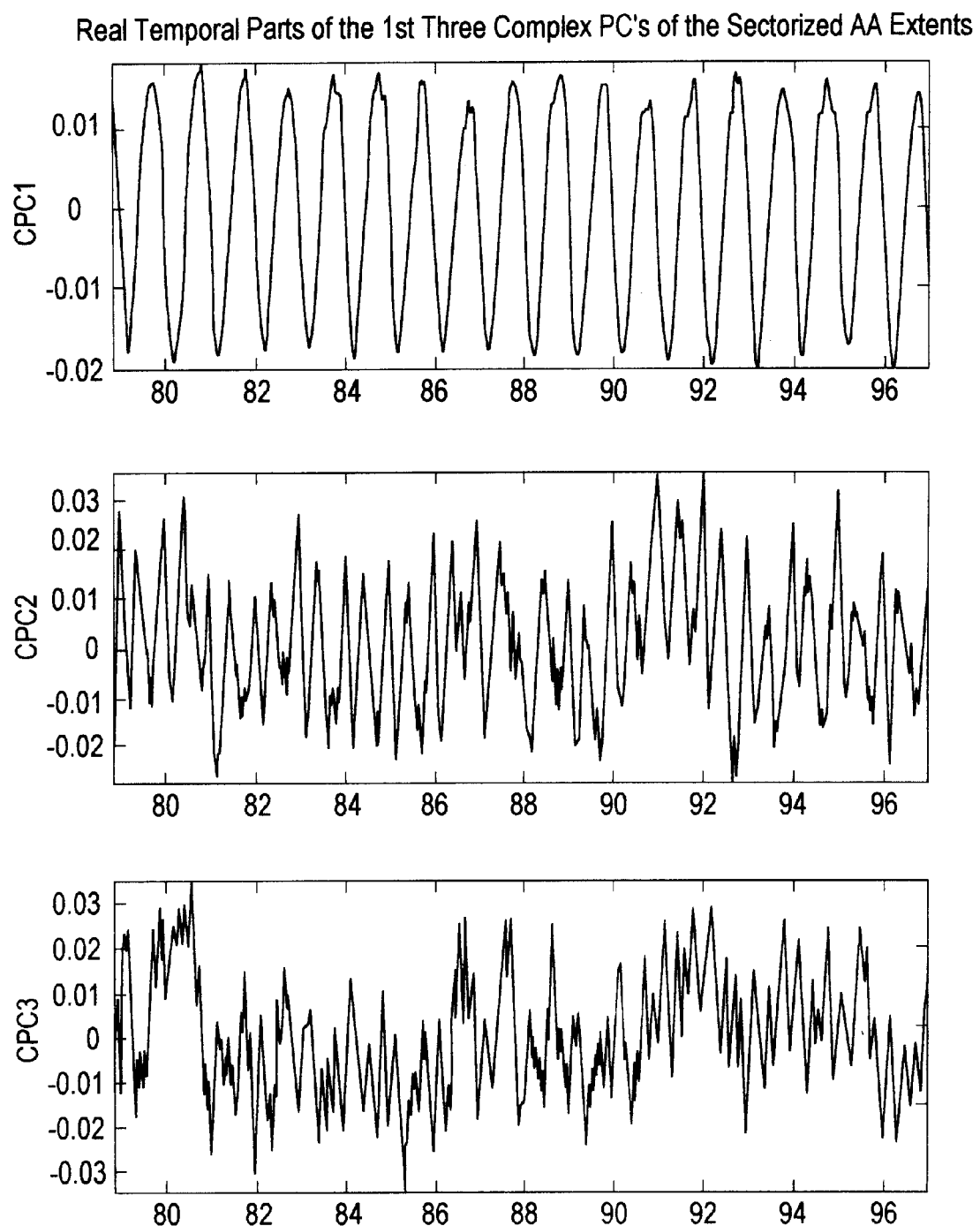

The spatial and temporal factors of the real part of the first three principal components are shown in FIGS. 6(a)–(b). Plots of the eigenvalue ratios of the CPCs and also of the cumulative fraction of the signal in the first n modes (obtained by taking the ratio of the sum of the eigenvalues of the first n modes and the sum of all the eigenvalues) are shown in FIGS. 6(a) and 6(b). FIG. 6(b) indicates that about 34% of the signal is contained in the first 3 CPCs. FIG. 6(a) indicates that the amplitude of the fourth CPC is about 11% of the first. Thus, we need utilize only the first three CPCs to obtain a reasonable approximation to the original signal and to visualize any circumpolar wave that might be present.

The temporal portions of the first 3 CPCs are processed by means of Empirical Mode Decomposition (EMD) into their intrinsic modes (IM), resulting in a collection of 2–3 CPCs for each intrinsic mode. It is important to note that the presence of several intrinsic modes for each CPC indicates that they are multi-modal. In particular, visual inspection of the temporal factor of CPC1 (FIG. 9(b)) might lead one to conclude that it contains only the seasonal cycle, but as is shown later this is far from the case. A simplistic description of this method of sifting a data vector, y(n), into nearly orthogonal intrinsic modes follows:

1. Obtain two vectors containing the extrema of y(n).
2. Fit maxima and minima with two cubic spline vectors of length n.
3. $m_1(n)$=average of the two cubic spline vectors.
4. First component, $c_1=y(n)-m_1(n)$.
5. Repeat steps 1–3 on $m_1(n)$ to obtain $m_2(n)$.
6. Second component $c_2=m_1(n)-m_2(n)$.

. . .

i. ith component, $c_i=m_{i-1}(n)-m_2(n)$.
Continue until $c_i$ contains less than one whole oscillation. This usually converges for i=8 to 10.

Conditional tests are included for assuring that the number of zero-crossings equal the number of extrema, for how many time series points are allowed between the extrema of the various modes, or how many are allowed between the extrema of the curvatures of the modes. By selecting input criteria judiciously the resultant modes are nearly orthogonal. A benefit of this approach is that the oscillations in the various modes are confined to narrow instantaneous frequency bands, greatly simplifying the interpretation of the results. Another benefit is that the original signal (within machine accuracy) is regained when the modes are added back together, indicating that spurious signals have not been introduced inadvertently as a result of the decomposition.

Figure 7A:
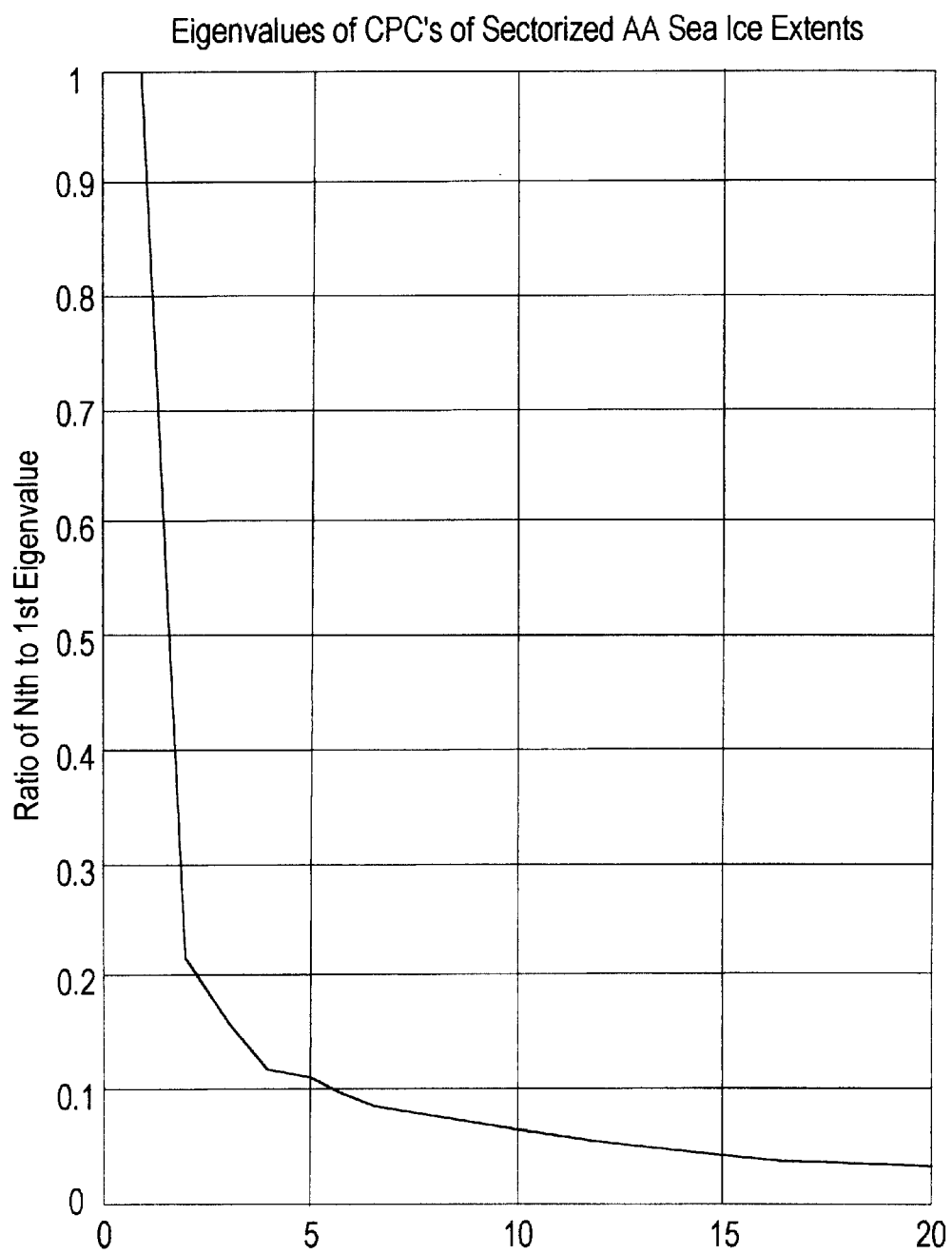
FIGS. 7(a)–(b) show Eigenvalue ratios of the first 20 complex principal components (CPCs) and the Percent of signal in the first N principal components (PCs), obtained from the ratio of the sum of the first N eigenvalues to their total sum.
Figure 7B:
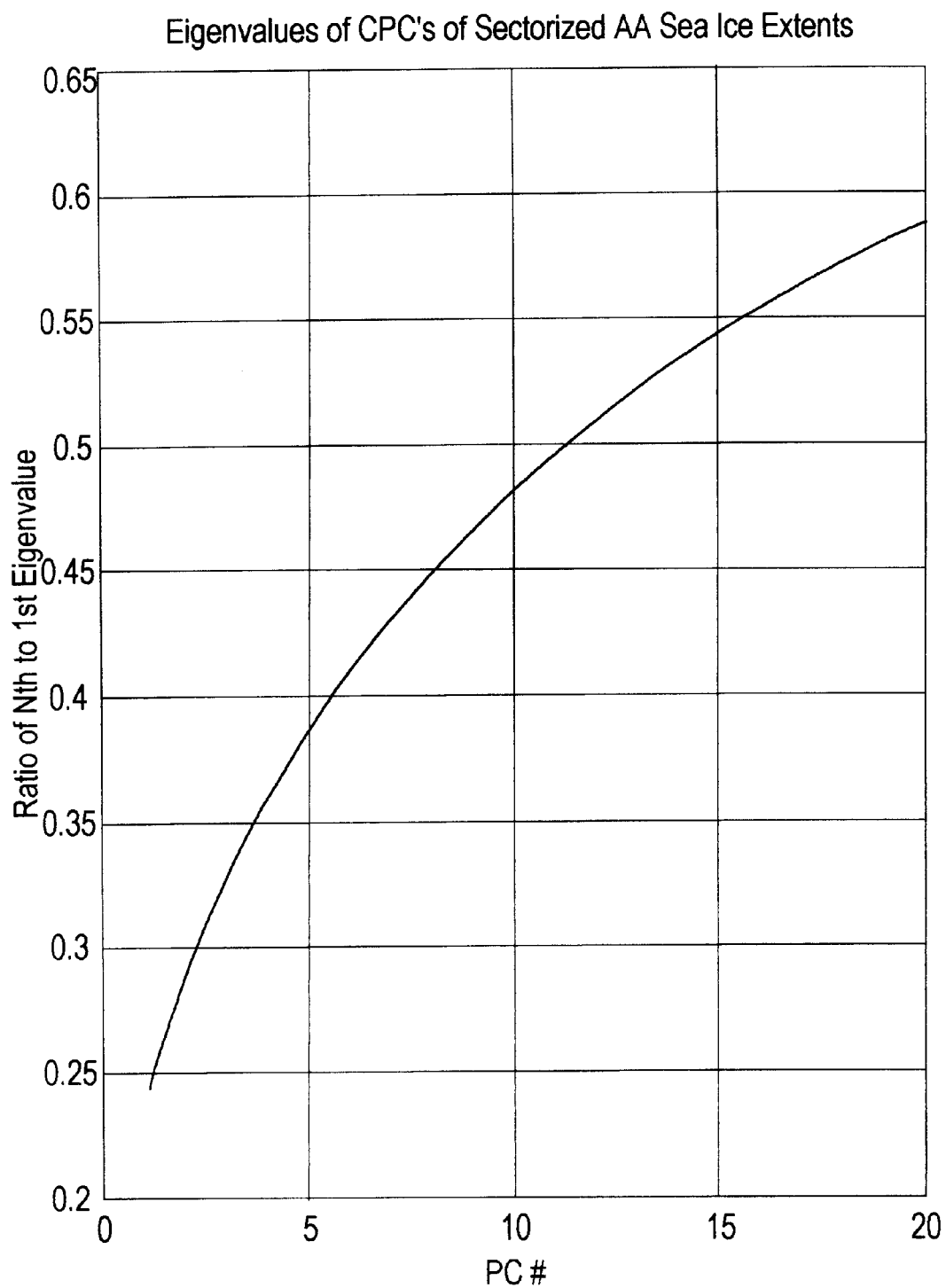
Figure 8:
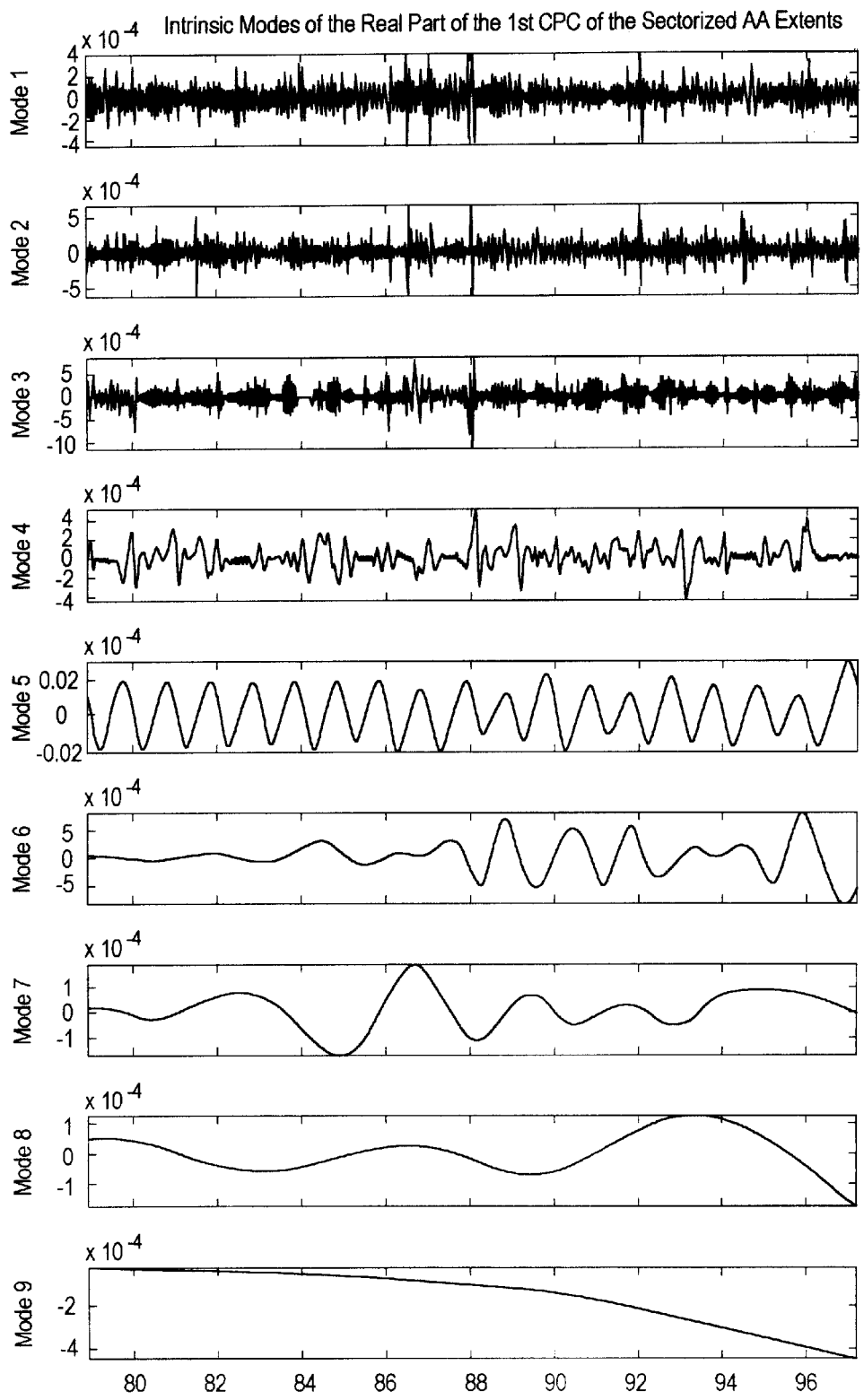
FIG. 8 shows intrinsic modes of the real temporal part of the first CPC.

The intrinsic modes of CPC1 are shown in FIG. 7. CPC1 appears to have 8 distinct oscillatory modes. The first mode contains the day-to-day fluctuations in the sea ice extent attributable to fluctuations in the weather. There is a flat area surrounded by two transients in this record occurring at the time of the aforementioned 21 day data gap, reflecting the lack of single-day fluctuations in the interpolated data. The second mode is largely semi-monthly oscillations, possibly related to the 14-day tidal frequency. The third mode appears to be largely monthly oscillations, with an irregular amplitude modulation envelope of an annual cycle. These oscillations were interpreted as the influence of the monthly oceanic tides on the edge of the sea ice, and the minima of the envelope reflecting the reduction of signal when the ice is at its annual minimum extent. The fourth mode is a mixture of periods larger than one month and shorter than one year of unknown origin. The fifth mode is what we shall call the seasonal, rather than annual, cycle because it is not a monochromatic sinusoid. The shape of the fifth mode differs from other seasonal cycle models, where 5 harmonics of the annual cycle are weighted and summed. The shape of the fifth mode derived using the present invention was found to approximate closely the observed seasonal cycles. The difference is attributable to the inability of Fourier analysis to produce a meaningful spectrum for a non-stationary phenomenon.

Modes 6–8 are of the most interest in the context of a search for a circumpolar wave in the Antarctic sea ice perimeter. The amplitudes of modes 6–8 are (respectively) about 0.25, 0.1, and 0.05 of the seasonal cycle amplitude (Mode 5). Modes 6 and 7 are quasi-biennial and quasi-quadrennial periods similar to those observed earlier in the Antarctic sea ice canopy with band-limited Fourier analysis of the 9-year Nimbus 7 data record and attributed to an atmospheric teleconnection with the El Niño and Southern Oscillation phenomena. Mode 8 contains periods in the range 6–7 years, which was only hinted at in the earlier studies of a 9-year data set. Finally, the last mode (9) contains the residual trend of the data set remaining after the initial subtraction of the trend line obtained by ordinary least squares. Although it displays some curvature, Mode 9 cannot be described convincingly as oscillatory.

The similarity between the modal structure of each of the first 3 CPCs and the rapid fall-off of their eigenvalues permit reconstruction of the original signal from its first 3 CPCs to a good approximation. Furthermore, the intrinsic modes of the original data can be reconstructed to a good approximation from the individual intrinsic modes of the first 3 CPCs.

As noted above, the data were reconstructed in two different ways. First, to simulate the 3–7 year bandpass filter and added together the intrinsic modes 7–9 of CPC1 (and similar modes of CPC2 and 3) to reconstruct a low-pass filtered time series. This excludes the quasibiennial modes (Mode 6 of CPC1) as well as the seasonal and shorter-period modes. Second, the quasiquadrennial (QQ) mode (Mode 7 of CPC1) is isolated to look for differences between the QQ-filtered and lp-filtered results.

Figure 9A:
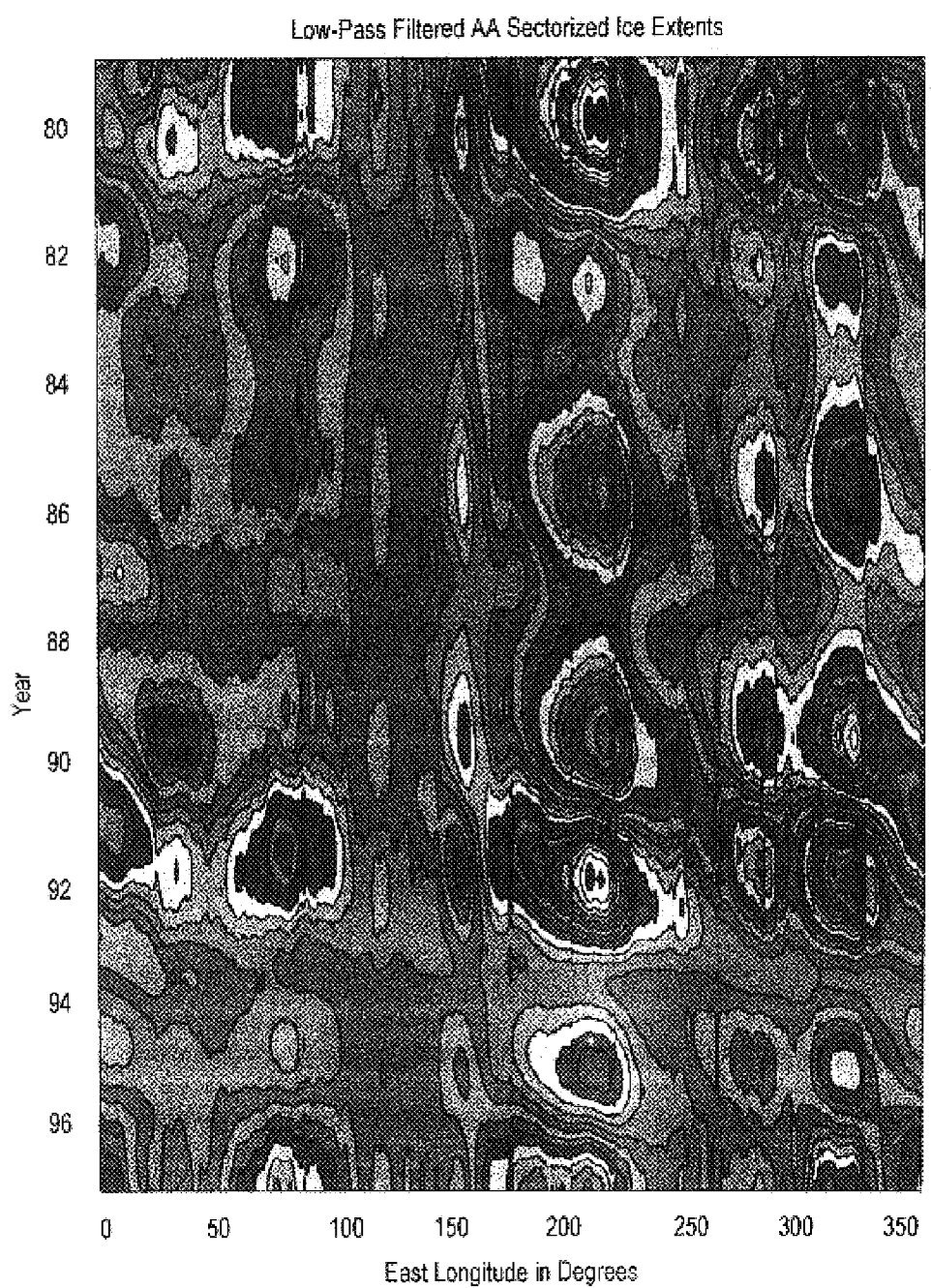
FIGS. 9(a)–(b) are a contour plot of the low-pass (lp) filtered data of the sectored Antarctic sea ice extents reconstructed from the sum of the intrinsic modes with periods longer than 3 years of the first 3 Principal Components and a three-dimensional plot of the same lp-filtered data.
Figure 9B:
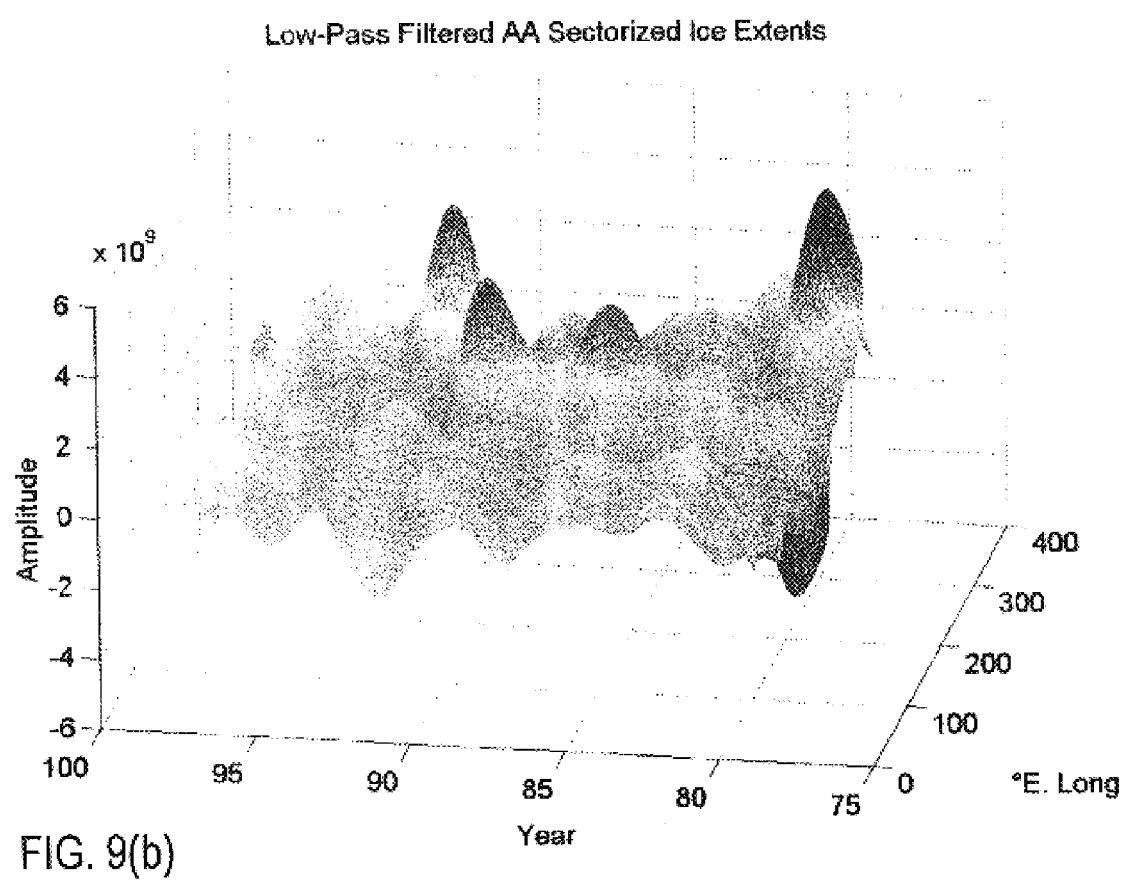

Time/longitude contours of the lp-filtered data (FIG. 9(a)) show eastward-propagating azimuthal motion, but no complete circumpolar circuit. The most prominent one begins in about 1990, with the crest at about 220° E and trough at about 320° E. The crest propagates eastward until about 1994, when it reaches about 40° E. The trough reaches 40° E in about 1992. The complicated combination of stationary and propagating troughs may be seen from a different perspective in the 3-dimensional contour diagram in FIG. 9(b). There seems to be a barrier between about 120–150° E (the part of the Southern Ocean south of the western Pacific) that the propagating waves do not cross.

Figure 10A:
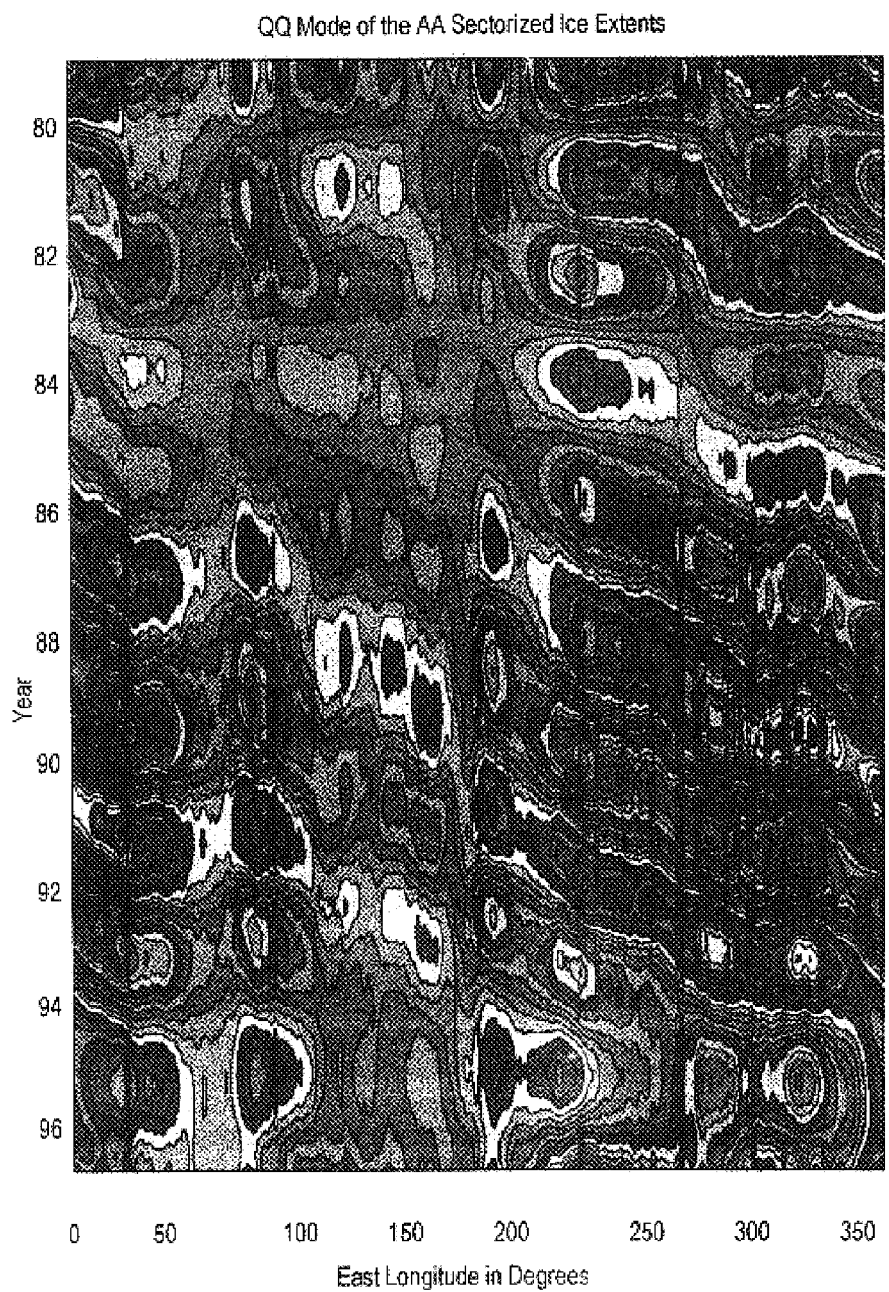
FIGS. 10(a)–(b) show a contour plot of the intrinsic seasonal mode of the sectored Antarctic sea ice extents reconstructed from the quasiquadrennial (QQ) parts of the first 3 PCs and a three-dimensional plot of the same physical phenomenon data.
Figure 10B:
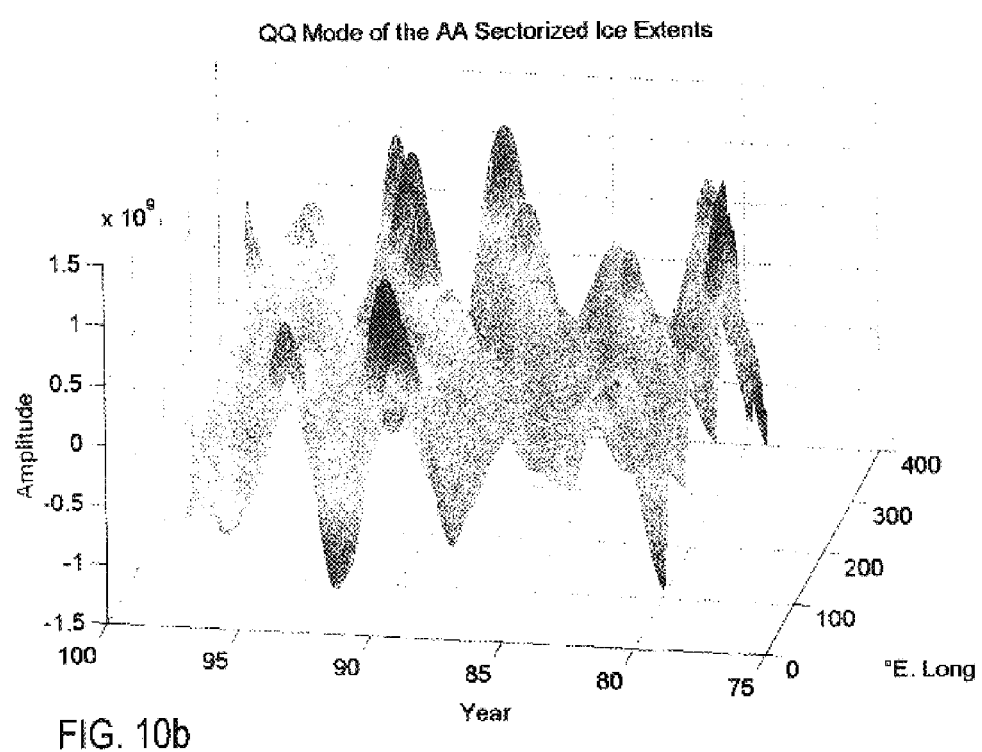

The aforementioned barrier appears to be absent in the propagation patterns of the QQ modes shown in FIGS. 10(a)–(b). Focusing again on two of the most prominent features, a trough beginning in about 1984 at about 220° E propagates eastward to 360° E until about mid-1986, then regresses westward for about ½ a year, resuming the eastward propagation to reach 360° E once again in about 1994, finally stopping at about 20° E in about mid-1995. Thus, the trough propagated for about 1.5 circumpolar cycles at a rate of about 1 cycle in 8 years. The adjacent crest also starts at about 220° E but in about mid-1985. It propagates eastward crossing the Greenwich Meridian in about 1985. There is a brief westward regression in about mid-1989, after which it continues eastward to about 300° E in about mid-1995 at which point the crest begins another westward regression.

Eastward propagation of a circumpolar wave have been reported in sea ice extents as well as in sea level pressures, and sea surface winds and temperatures. The data were preprocessed by passing through a band-pass filter with admittance from 3 to 7 years. Sea ice extents were analyzed in 5° meridional sectors, and other parameters along the 56° S parallel. The contour patterns were interpreted on their resulting position, time diagrams as circumpolar waves propagating eastwards and completing the circular traverse in about a decade. Thus, the low-pass filter procedure is believed to encompass the entire band-passed filtered oscillatory behavior.

Initially, this Antarctic sea ice extent investigation was undertaken to confirm what was the commonly held belief and to examine in detail what has been previously reported, regarding the circumpolar wave in sea ice extents. Unexpectedly, however, the sea ice extent results obtained with lp filter of the present invention do not agree with prior results. Perhaps, the prior practice of binning of the sea ice extents into 5° sectors, thereby limiting the spatial resolution to about 10° of longitude, may have bridged the "barrier" between 120–150° that was observed in lp-filtered results of the present invention. Alternatively, the high frequency end of the prior art band-pass filter with a half-power point of 3 years, may suppress part of the signal admitted by lp-filter of the present invention. When oscillations of 3 years or less are eliminated with QQ filter, the results are much more in agreement.

The results of applying the present invention to this 3D physical phenomenon clearly demonstrate the necessity of using a complex number representation of the time series in order to retain the circumpolar motion in the sea-ice pack when applying singular value decomposition. Earlier attempts at observing the circumpolar motion with real numbers was unsuccessful. Accordingly, it is clear that care must be used in selecting the appropriate filters and the need for high spatial resolution in order not to lose important details in the wave propagation. Finally, it is imprudent to presume that complex principal components in themselves represent fundamental modes of an oscillatory system. For instance, the first CPC shown here in FIGS. 6(a)–(b) could easily be mistaken by inspection for the season cycle. While the seasonal cycle is the largest oscillatory component of the first CPC, the first CPC also has 7 other significant oscillatory modes.

Alternative Embodiments

As described above, in the EMD step 110, upper and lower envelopes 20, 30 are constructed with a cubic spline in steps 210 and 230, respectively. This cubic spline fitting, however, has both overshoot and undershoot problems.

These problems can be alleviated by using sore sophisticated spline methods, such as the taut spline in which the tension of the spline curve can be adjusted.

Another alternative is higher-order spline fitting. Although such higher-order spline fitting may be more accurate, it will, however, introduce more inflection points or extrema, and consume more computing time. Therefore, it is not recommended as a standard operation. Only in special cases, it may be tried.

As the spline fitting procedure is time consuming, more efficient methods can be devised by using simple mean values of successive extrema instead of computing the envelope-mean. In this way, only one spline fitting is required rather than two. Although this alternative is easier and faster to implement, the shortcomings are more severe amplitude averaging effects when the neighboring extrema are of different magnitudes. The successive-mean method will have a stronger forcing to reach uniform amplitudes, in which the true physics associated with amplitude will be destroyed. Therefore, the successive-mean method should only be applied where the amplitudes of the physical signal components are constants.

Either the envelope mean or the successive mean method, when applied with the requirement of absolute symmetry, will produce the absurd result of uniform amplitude IMF's. Therefore, the criteria in the Sifting Process should be chosen judiciously. One should avoid too stringent a criterion that we would get uniform amplitude IMF's. On the other hand, one should also avoid too loose a criterion that would produce components deviating too much from IMF's.

It is well known that the most serious problem of spline fitting is at the ends, where cubic splines can have wide swings if left unattended. As an alternative, the invention may utilize a method of adding characteristic waves at the ends of the data span. This confines the large swings successfully.

The method of adding characteristic waves is not conventional. In contrast, the conventional window that is often applied to Fourier transform data results in loss of useful data. To avoid this data loss and to confine swings at the ends of the data span, the invention extends the data beyond the actual data span by adding three additional characteristic waves at each end of the data span.

The characteristic waves are defined by the last wave within the data span at the end of the data span. In other words, a characteristic wave is added to each end of the data span having an amplitude and period matching the last wave within the data span. This characteristic wave is a sinusoidal waveform that is extended three sinusoidal wave periods beyond the data span at each end. This process is repeated at the other end of the data span. In this way, spline fitting at the end of the data span, which can otherwise have a wide swing, is confined. In other words, by adding the extra characteristic waves at the ends beyond the data span, the spline curve will be tied down so that it will not have wild or excessive swings that would otherwise corrupt the data processing and analysis that utilizes these cubic splines.

Other than the spline fitting, the Hilbert transform may also have end effects. Because the first and the last points of the data are usually of different values, the Fourier transform will introduce additional components to bridge over the difference resulting in the well-known Gibbs phenomena. To eliminate it in the Fourier transform, various windows have been adopted (see, for example, Brigham, 1974, *"The fast Fourier Transform"*, Prentice-Hall, Englewood Cliffs, N.J.).

Instead of a window which will eliminate some useful data at the end, the invention again adds two characteristic waves at either end. These waves all start from zero at the beginning, and end at zero at the end. Thus, the annoying Gibbs phenomena are greatly reduced.

Still further, the Hilbert transform needs over-sampled data to define the instantaneous frequency precisely. In Fourier analysis, the Nyquist frequency is defined by two points per wave, but the frequency is defined for a wave covering the whole data span. In the invention, the instantaneous frequency is defined through a differentiation process, and thus more data points will help defining the frequency more accurately. Based on the inventor's experience, a minimum number of data points to define a frequency is five (or four At's). The lack of fine time steps can be alleviated through interpolating more points between available data. As a spline interpretation would also not create nor annihilate scales, it can also be used for the interpolation when the data are very jagged from under-sampled data. The smoothed data though have a longer length and are sometimes easier to process. The interpolation may give better frequency definition.

Particular Limitations of The Invention

The dependence on the existence of scale for mode definition has one limitation: the decomposition method cannot separate signals when their frequencies are too close. In this case, there would not be any characteristic scale: therefore, physically they are identical. This may be the most severe limitation of the invention, but even here, the invented method can still work as well as the Fourier Analysis.

Particular Advantages of The Invention

The strength of the EMD method should be reiterated. EMD is built on the idea of identifying the various scales in the data which are quantities of great physical significance. Therefore, in the local extrema and curvature extrema Sifting Processes, orthogonality is not a consideration, but scales are. Since orthogonal decomposition is a characteristic for linear systems, violating this restriction is not a shortcoming but a breakthrough. Therefore, the decomposed IMF's may or may not be orthogonal. As such, this method can be applied to nonlinear data. Though the IMF's in most cases are practically orthogonal, it is a coincidence rather than a requirement of the EMD.

Finally, though the EMD method will give IMF components, the individual component does not guarantee well-defined physical meaning. This is true for all decompositions, especially for the methods with a priori basis. In most cases, however, the IMF's do carry physical significance. Great caution should be exercised in making such attempts. The rule for interpreting the physical significance of the IMF's is that the scales should be clearly separated. Together with the Hilbert spectrum, the totality of the presentation should give a much more detailed representation of the physical processes than conventional methods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A computer implemented method of analyzing three-dimensional (3D) phenomena, said method comprising the steps of:

inputting a representation of a 3D phenomenon;

creating a complex representation of said 3D phenomenon;

recursively sifting said complex representation using Empirical Mode Decomposition to extract an intrinsic mode function indicative of an intrinsic oscillatory mode; and processing the intrinsic mode function.

2. A computer implemented method of analyzing 3D phenomena as in claim 1, wherein the step of creating a complex function comprises the steps of:

reshaping said 3D representation into a two-dimensional (2D) representation; and applying a Hilbert transform to said reshaped 3D representation, the result being said complex representation.

3. A computer implemented method of analyzing 3D phenomena as in claim 2, wherein the analyzed 3D phenomenon is a seasonal physical phenomenon and the step of reshaping the 3D representation further comprises:

deseasoning said reshaped representation (AA), the Hilbert transform being applied to said deseasoned reshaped representation ($AA_{Deseasoned}$).

4. A computer implemented method of analyzing 3D phenomena as in claim 3, wherein the step of deseasoning the 2D representation further comprises removing a trend line using multiple linear regression, the deseasoned 2D representation being described by the relationship:

$$AA_{Deseasoned} = AA - a_0 + a_1 t + \sum_{k=1}^{5} [a_{2k}\cos(2\pi kt/\tau) + a_{(2k+1)}\sin(2\pi kt/\tau)],$$

wherein $a_0$, $a_1$, $a_{2k}$, $a_{2k+1}$ result from multiple linear regression and $\tau$ is the annual period.

5. A computer implemented method of analyzing 3D phenomena as in claim 3, wherein in the reshaping step the 3D representation is restructured as a series of longitudinal sector extents.

6. A computer implemented method of analyzing 3D phenomena as in claim 5, wherein said series is a time series and wherein each of said longitudinal extents is the sum of all areas of a selected granularity having a selected characteristic identified as being above a given threshold.

7. A computer implemented method of analyzing 3D phenomena as in claim 6, wherein said selected area of granularity is represented by a pixel on a display of said phenomenon and said threshold is 15%.

8. A computer implemented method of analyzing 3D phenomena as in claim 3, wherein the step of applying the Hilbert transform preserves spatial phase information in said 2D representation.

9. A computer implemented method of analyzing 3D phenomena as in claim 8, said method further comprising:

applying singular value decomposition to the result of the Hilbert transform, complex principal components being extracted from the Hilbert transform results.

10. A computer implemented method of analyzing 3D phenomena as in claim 9, wherein the result of the Hilbert transform may be represented as a two-dimensional matrix, $A_{complex}$, the extracted spatial component may be represented as a two-dimensional matrix, U, and the result of the extracted temporal component can be represented as a two-dimensional matrix, V, and wherein $A_{complex}=U*S*V'$, S being an eigenvalue matrix and V' being the transpose of V.

11. A computer implemented method of analyzing 3D phenomena as in claim 10, wherein EMD is performed on the temporal parts (V) of a plurality of complex principal components.

12. A computer implemented method of analyzing 3D phenomena as in claim 11, wherein the plurality of complex principal components is 10.

13. A computer implemented method of analyzing 3D phenomena as in claim 12, wherein, in the processing step, the 3D phenomena representation is reconstructed by selecting one or more modes, selected said one or more modes constituting a band-pass filter.

14. A computer implemented method of analyzing 3D phenomena as in claim 13, wherein the reconstructed filtered ($A_{complex, filtered}$) 3D phenomenon may be represented as:

$A_{complex, filtered}=U$(position, 1:10)$*S$(1:10, 1:10)$*V_{filtered}$(time, 1:10)'.

15. A computer implemented method of analyzing 3D phenomena as in claim 13, wherein the real part of the reconstructed representation is reshaped into a sequence of filtered grid maps.

16. A computer implemented method of analyzing 3D phenomena as in claim 15, wherein the processing step further comprises displaying filtered grid maps.

17. A three-dimensional (3D) phenomena analysis apparatus comprising:

a receiver receiving a representation of a 3D phenomenon;

a component extractor extracting a temporal component and a spatial component to form a complex representation of said 3D phenomenon;

an intrinsic mode extractor recursively sifting said complex representation using Empirial Mode Decomposition to extract an intrinsic mode function indicative of an intrinsic oscillatory mode; and means for processing the intrinsic mode function to regenerate a displayable representation of said 3D phenomena.

18. A 3D phenomena analysis apparatus as in claim 17, wherein the component extractor comprises:

a reshaper reshaping said 3D representation into a two-dimensional (2D) representation; and a Hilbert Spectrum generator applying a Hilbert transform to said 2D representation, the result being said complex representation.

19. A 3D phenomena analysis apparatus as in claim 18, wherein the reshaper comprises:

a segmenter segmenting the 3D representation into a plurality of uniform segments, the area of each of said segments being a plurality of uniform granularity areas; and a counter counting selected ones of said uniform granularity areas.

20. A 3D phenomena analysis apparatus as in claim 19, wherein the reshaper further comprises:

weight determination means for determining a weight attached to each of said uniform granularity areas, said counter counting said uniform granularity areas having a weight above a selected threshold.

21. A 3D phenomena analysis apparatus as in claim 18, wherein the analyzed 3D phenomenon is a seasonal physical phenomenon and the component extractor further comprises:

a deaseasoner deseasoning said reshaped representation, said deseasoned reshaped representation being said 2D representation (AA).

22. A 3D phenomena analysis apparatus as in claim 21, wherein the deseasoner comprises:

sinusoidal calculation means for determining time dependent sine and cosine values;

a multiplier combining selected coefficient with calculated sine and cosine values; and an adder combining a plurality of products from said multiplier with said reshaped representation.

23. A 3D phenomena analysis apparatus as in claim 21, wherein said deseasoner includes multiple linear regression means and also removes trend lines from said reshaped representation (AA), said deseasoned reshaped representation (AA$_{Deseasoned}$) having the form:

$$AA_{Deseasoned} = AA - a_0 + a_1 t + \sum_{k=1}^{5} [a_{2k}\cos(2\pi kt/\tau) + a_{(2k+1)}\sin(2\pi kt/\tau)],$$

multiple linear regression means generating $a_0$, $a_1$, $a_{2k}$ and $a_{2k+1}$ and, $\tau$ being the annual period of said 3D representation.

24. A 3D phenomena analysis apparatus as in claim 21, wherein the Hilbert spectrum generator preserves spatial phase information in said 2D representation.

25. A 3D phenomena analysis apparatus as in claim 24, further comprising:

a singular value decomposer extracting complex principal components from the complex representation.

26. A 3D phenomena analysis apparatus as in claim 25, wherein the Hilbert spectrum generator generates a two-dimensional matrix, A$_{complex}$, the singular value decomposer extracts a spatial component represented as a two-dimensional matrix, U, and a temporal component represented as a two-dimensional matrix, V, and wherein $$A_{complex} = U*S*V',$$

S being an eigenvalue matrix and V' being the transpose of V.

27. A 3D phenomena analysis apparatus as in claim 26, wherein the intrinsic mode extractor performs EMD on the temporal parts (V) of a plurality of complex principal components.

28. A 3D phenomena analysis apparatus as in claim 27, wherein the processing means selects one or more modes to reconstruct the filtered 3D phenomena representation.

29. A 3D phenomena analysis apparatus as in claim 28, wherein the reconstructed filtered (A$_{complex, filtered}$) 3D phenomenon is represented as $$A_{complex, filtered} = U(\text{position}, 1{:}f)*S(1{:}f, 1{:}f)*V_{filtered}(\text{time}, 1{:}f)',$$

f being the number of complex principal components included in the filter.

30. A 3D phenomena analysis apparatus as in claim 28, wherein the processing means reshapes the real part of the reconstructed representation into a sequence of filtered grid maps.

31. A 3D phenomena analysis apparatus as in claim 30, further comprising:

a display displaying filtered grid maps.

32. A 3D phenomena analysis apparatus as in claim 17, further comprising:

a display displaying said regenerated representation of said 3D phenomenon.

33. A computer program product for analyzing 3D phenomena, said computer program product comprising a computer usable medium having computer readable program code comprising:

computer readable program code means for receiving a representation of a 3D phenomenon;

computer readable program code means for forming a complex representation of said 3D phenomenon, said complex representation including a temporal component and a spatial component;

computer readable program code means for recursively sifting said complex representation using Empirical Mode Decomposition to extract an intrinsic mode function indicative of an intrinsic oscillatory mode; and computer readable program code means for processing the intrinsic mode function to regenerate a displayable representation of said 3D phenomena.

34. A computer program product for analyzing 3D phenomena as in claim 33, wherein the computer readable program code means for forming the complex representation comprises:

computer readable program code means for reshaping said 3D representation into a two-dimensional (2D) representation; and computer readable program code means for applying a Hilbert transform to said 2D representation, the result being said complex representation.

35. A computer program product as in claim 34, wherein the computer readable program code means for reshaping comprises:

computer readable code means for restructuring said 3D representation as a series of longitudinal extents.

36. A computer program product as in claim 35, wherein each of the longitudinal extents represents a proportion of a sector of said 3D representation, said proportion indicating a portion of said sector having a measured property beyond a threshold level.

37. A computer program product for analyzing a 3D phenomena as in claim 34, wherein the analyzed 3D phenomenon is a seasonal physical phenomenon and the computer readable program code means for extracting components further comprises:

computer readable program code means for deseasoning said reshaped representation, said deseasoned reshaped representation being said 2D representation (AA).

38. A computer program product for analyzing a 3D phenomena as in claim 37, wherein the computer readable program code means for deseasoning the 2D representation removes trend lines and comprises computer readable program code means for applying multiple linear regression, the deseasoned 2D representation (AA$_{Deseasoned}$) satisfying the relationship:

$$AA_{Deseasoned} = AA - a_0 + a_1 t + \sum_{k=1}^{5} [a_{2k}\cos(2\pi kt/\tau) + a_{(2k+1)}\sin(2\pi kt/\tau)],$$

$a_0$, $a_1$, $a_{2k}$ and $a_{2k+1}$ being generated by multiple linear regression and, $\tau$ being the annual period of said 3D representation.

39. A computer program product for analyzing 3D phenomena as in claim 38, wherein the computer readable program code means for applying the Hilbert transform preserves spatial phase information in said 2D representation.

40. A computer program product for analyzing 3D phenomena as in claim 39, further comprising:

computer readable program code means for applying singular value decomposition to the result of the Hilbert transform, complex principal components being extracted from the Hilbert transform results.

41. A computer program product for analyzing 3D phenomena as in claim 40, wherein the result of the Hilbert transform may be represented as a two-dimensional matrix, $A_{complex}$, the extracted spatial component may be represented as a two-dimensional matrix, U, and the result of the extracted temporal component can be represented as a two-dimensional matrix, V, and wherein $$A_{complex} = U*S*V',$$

S being an eigenvalue matrix and V' being the transpose of V.

42. A computer program product for analyzing 3D phenomena as in claim 41, wherein the computer program product means for recursively sifting applies EMD to the temporal parts (V) of a plurality of complex principal components.

43. A computer program product for analyzing 3D phenomena as in claim 42, where the computer readable program code means for the processing further comprises: computer program product means for reconstructing the 3D phenomena representation by selecting one or more modes, selected said one or more modes constituting a band-pass filter.

44. A computer program product for analyzing 3D phenomena as in claim 43, where the computer readable program code means for reconstructing reconstructs the filtered 3D phenomenon ($A_{complex,\ filtered}$) represented as:

$$A_{complex,\ filtered} = U(\text{position}, 1:f)*S(1:f,\ 1:f)*V_{filtered}(\text{time}, 1:f)',$$

f being the number of complex principal components included in the filter.

45. A computer program product for analyzing 3D phenomena as in claim 43, wherein the computer readable program code means for processing comprises computer program product means for reshaping the real part of the reconstructed representation into a sequence of filtered grid maps.

46. A computer program product for analyzing 3D phenomena as in claim 45, wherein the computer readable program code means for processing further comprises computer readable program code means for providing filtered grid maps for display.

* * * * *